US011457395B2

(12) United States Patent
Greene et al.

(10) Patent No.: US 11,457,395 B2
(45) Date of Patent: Sep. 27, 2022

(54) WIRELESS SENSOR SYSTEM, METHOD AND APPARATUS WITH SWITCH AND OUTLET CONTROL

(71) Applicant: Powercast Corporation, Pittsburgh, PA (US)

(72) Inventors: Charles E. Greene, Cabot, PA (US); Daniel W. Harrist, Carnegie, PA (US)

(73) Assignee: Powercast Corporation, Pittsburgh, PA (US)

( * ) Notice: Subject to any disclaimer, the term of this patent is extended or adjusted under 35 U.S.C. 154(b) by 225 days.

(21) Appl. No.: 16/859,617

(22) Filed: Apr. 27, 2020

(65) Prior Publication Data

US 2020/0260356 A1 Aug. 13, 2020

Related U.S. Application Data

(63) Continuation of application No. 15/012,244, filed on Feb. 1, 2016, now Pat. No. 10,638,399, which is a
(Continued)

(51) Int. Cl.
*H04W 40/08* (2009.01)
*G08C 17/02* (2006.01)
(Continued)

(52) U.S. Cl.
CPC ............ *H04W 40/08* (2013.01); *G08C 17/02* (2013.01); *H04B 7/15507* (2013.01);
(Continued)

(58) Field of Classification Search
CPC ... H04W 40/08; G08C 17/02; H04B 7/15507; H04Q 9/00; H04Q 2209/40; H04Q 2209/886
See application file for complete search history.

(56) References Cited

U.S. PATENT DOCUMENTS 5,978,364 A 11/1999 Melnik
5,982,103 A 11/1999 Mosebrook et al.
(Continued)

FOREIGN PATENT DOCUMENTS

CN 1981313 A 6/2007
CN 101283257 A 10/2008
(Continued)

OTHER PUBLICATIONS

Extended European Search Report issued by the European Patent Office for Application No. 17166893.2, dated Oct. 12, 2017, 5 pages.
(Continued)

*Primary Examiner* — Kibrom T Hailu
(74) *Attorney, Agent, or Firm* — Cooley LLP

(57) ABSTRACT

In some embodiments an apparatus includes a wireless sensor configured to be operatively coupled to a network gateway device that is configured to receive one of a first data packet or a second packet from the wireless sensor. The wireless sensor is configured to send the first data packet at a first time on a first frequency, the first data packet including a payload associated with a value of a measurement that was measured by the wireless sensor. The wireless sensor is configured to send the second data packet at a second time on a second frequency, the second data packet includes a payload associated with the value.

36 Claims, 17 Drawing Sheets

Related U.S. Application Data continuation of application No. 13/848,667, filed on Mar. 21, 2013, now Pat. No. 9,251,699.

(60) Provisional application No. 61/613,753, filed on Mar. 21, 2012.

(51) Int. Cl.
  *H04Q 9/00* (2006.01)
  *H04B 7/155* (2006.01)

(52) U.S. Cl.
  CPC ............ *H04Q 9/00* (2013.01); *H04Q 2209/40* (2013.01); *H04Q 2209/886* (2013.01)

(56) References Cited

U.S. PATENT DOCUMENTS

| | | |
|---|---|---|
| 6,687,487 B1 | 2/2004 | Mosebrook et al. |
| 7,110,762 B1 | 9/2006 | Cameron et al. |
| 7,729,431 B2 | 6/2010 | Gebara et al. |
| 7,868,482 B2 | 1/2011 | Greene et al. |
| 8,077,035 B2 | 12/2011 | Reid et al. |
| 8,370,093 B1 | 2/2013 | Adams |
| 8,538,596 B2 | 9/2013 | Gu et al. |
| 9,026,283 B2 * | 5/2015 | Baldwin ............... B61L 29/282 |
| | | 701/19 |
| 9,246,573 B1 | 1/2016 | Gettings et al. |
| 9,251,699 B2 | 2/2016 | Greene et al. |
| 9,795,016 B2 | 10/2017 | Motley et al. |
| 10,149,370 B2 | 12/2018 | Greene et al. |
| 10,455,663 B2 | 10/2019 | Greene et al. |
| 10,524,337 B2 | 12/2019 | Greene et al. |
| 10,638,399 B2 | 4/2020 | Greene et al. |
| 10,979,961 B2 | 4/2021 | Greene et al. |
| 11,039,524 B2 | 6/2021 | Greene et al. |
| 11,102,869 B2 | 8/2021 | Greene et al. |
| 2002/0027504 A1 | 3/2002 | Davis et al. |
| 2004/0141502 A1 | 7/2004 | Corson et al. |
| 2004/0174287 A1 | 9/2004 | Deak |
| 2004/0192415 A1 | 9/2004 | Luglio et al. |
| 2005/0003763 A1 | 1/2005 | Lastinger et al. |
| 2005/0102040 A1 | 5/2005 | Kruse et al. |
| 2005/0210340 A1 | 9/2005 | Townsend et al. |
| 2005/0253538 A1 | 11/2005 | Shah et al. |
| 2007/0191075 A1 | 8/2007 | Greene et al. |
| 2007/0222681 A1 | 9/2007 | Greene et al. |
| 2007/0255116 A1 | 11/2007 | Mehta et al. |
| 2007/0255126 A1 | 11/2007 | Moberg et al. |
| 2007/0255348 A1 | 11/2007 | Holtzclaw |
| 2007/0273307 A1 | 11/2007 | Westrick |
| 2007/0290840 A1 | 12/2007 | Ehrman et al. |
| 2008/0129495 A1 | 6/2008 | Hitt |
| 2008/0129538 A1 | 6/2008 | Vaswani et al. |
| 2008/0220828 A1 | 9/2008 | Jensen |
| 2008/0253327 A1 | 10/2008 | Kohvakka et al. |
| 2008/0264799 A1 | 10/2008 | Sibert |
| 2008/0290822 A1 | 11/2008 | Greene et al. |
| 2008/0299896 A1 | 12/2008 | Mohebbi |
| 2009/0088605 A1 | 4/2009 | Ross et al. |
| 2009/0135745 A1 | 5/2009 | Gainey et al. |
| 2009/0231167 A1 | 9/2009 | Chen |
| 2009/0302782 A1 | 12/2009 | Smith |
| 2010/0102926 A1 | 4/2010 | Grieve et al. |
| 2010/0141153 A1 | 6/2010 | Recker et al. |
| 2010/0237711 A1 | 9/2010 | Parsons |
| 2010/0244706 A1 * | 9/2010 | Steiner ................. G01J 1/16 |
| | | 250/214 D |
| 2010/0284446 A1 | 11/2010 | Mu et al. |
| 2010/0289703 A1 | 11/2010 | Huang |
| 2010/0327766 A1 | 12/2010 | Recker et al. |
| 2011/0004801 A1 | 1/2011 | Duffy et al. |
| 2011/0051703 A1 | 3/2011 | Fulknier |
| 2011/0104919 A1 | 5/2011 | Patel et al. |
| 2011/0110281 A1 | 5/2011 | Mehta et al. |
| 2011/0178650 A1 | 7/2011 | Picco |
| 2011/0187275 A1 | 8/2011 | Giltaca et al. |
| 2011/0214318 A1 * | 9/2011 | Dunko ................. B42D 15/022 |
| | | 455/414.1 |
| 2011/0220182 A1 | 9/2011 | Lin et al. |
| 2011/0260628 A1 | 10/2011 | Dobkin et al. |
| 2011/0317625 A1 | 12/2011 | Urguhart et al. |
| 2012/0062123 A1 | 3/2012 | Jarrell et al. |
| 2012/0092192 A1 | 4/2012 | Wong |
| 2012/0098446 A1 | 4/2012 | Kim et al. |
| 2012/0136485 A1 | 5/2012 | Weber |
| 2012/0147808 A1 | 6/2012 | Rhee |
| 2012/0191990 A1 * | 7/2012 | Hodge ................. G06F 1/3203 |
| | | 713/300 |
| 2012/0235579 A1 | 9/2012 | Chemel et al. |
| 2012/0242454 A1 | 9/2012 | Wyler |
| 2012/0274208 A1 | 11/2012 | Chen et al. |
| 2012/0320781 A1 | 12/2012 | Furukawa et al. |
| 2013/0049607 A1 | 2/2013 | Urata |
| 2013/0062474 A1 * | 3/2013 | Baldwin ............... B61L 29/282 |
| | | 246/122 R |
| 2013/0063027 A1 | 3/2013 | Recker et al. |
| 2013/0073250 A1 | 3/2013 | Acker |
| 2013/0193856 A1 | 8/2013 | Chalmers et al. |
| 2013/0250845 A1 | 9/2013 | Greene et al. |
| 2013/0300318 A1 | 11/2013 | Kim et al. |
| 2013/0342131 A1 | 12/2013 | Recker et al. |
| 2014/0021862 A1 | 1/2014 | Chung |
| 2014/0132084 A1 | 5/2014 | Pham et al. |
| 2014/0167621 A1 | 6/2014 | Cree |
| 2014/0177469 A1 | 6/2014 | Neyhart |
| 2014/0225526 A1 | 8/2014 | Jonsson |
| 2014/0263977 A1 | 9/2014 | Jones |
| 2014/0268628 A1 | 9/2014 | Mann |
| 2014/0297227 A1 | 10/2014 | Barnard |
| 2014/0354161 A1 | 12/2014 | Aggarwal |
| 2014/0355246 A1 | 12/2014 | Yotsumoto et al. |
| 2015/0015377 A1 | 1/2015 | Bull |
| 2015/0065160 A1 | 3/2015 | Meredith et al. |
| 2015/0076996 A1 | 3/2015 | Flatz |
| 2015/0108901 A1 | 4/2015 | Greene et al. |
| 2015/0292764 A1 | 10/2015 | Land, III et al. |
| 2015/0325112 A1 | 11/2015 | McPherson et al. |
| 2015/0373796 A1 | 12/2015 | Bahrehmand |
| 2016/0192458 A1 | 6/2016 | Keith |
| 2016/0192461 A1 | 6/2016 | Minsky |
| 2016/0198388 A1 | 7/2016 | Greene et al. |
| 2017/0027043 A1 | 1/2017 | Greene et al. |
| 2018/0103411 A1 | 4/2018 | Greene et al. |
| 2018/0310389 A1 * | 10/2018 | Recker .................. H05B 45/20 |
| 2019/0254146 A1 | 8/2019 | Greene et al. |
| 2020/0053855 A1 | 2/2020 | Greene et al. |
| 2020/0214113 A1 | 7/2020 | Greene et al. |

FOREIGN PATENT DOCUMENTS

| | | |
|---|---|---|
| CN | 101341521 A | 1/2009 |
| CN | 102217425 A | 10/2011 |
| CN | 102573220 A | 7/2012 |
| DE | 102012205964 A1 | 10/2013 |
| EP | 2 071 777 A1 | 6/2009 |
| JP | S57-179299 U | 11/1982 |
| JP | S62-221205 A | 9/1987 |
| JP | H06-266458 A | 9/1994 |
| JP | H11-504785 | 4/1999 |
| JP | 2005-159670 A | 6/2005 |
| JP | 2005-259437 A | 9/2005 |
| JP | 2005-294456 A | 10/2005 |
| JP | 2006-134841 A | 5/2006 |
| JP | 2006-243979 A | 9/2006 |
| JP | 2007-122433 A | 5/2007 |
| JP | 2009-089379 A | 4/2009 |
| JP | 2009-223724 A | 10/2009 |
| JP | 2010-056613 A | 3/2010 |
| JP | 2010-146923 A | 7/2010 |
| JP | 2011-008971 A | 1/2011 |
| JP | 2011-079461 A | 4/2011 |
| JP | 2011-085393 A | 4/2011 |
| JP | 2011-135549 A | 7/2011 |
| JP | 2011-137782 A | 7/2011 |

(56) References Cited

FOREIGN PATENT DOCUMENTS

| JP | 2011-151630 A | 8/2011 |
|---|---|---|
| JP | 2012-038188 A | 2/2012 |
| JP | 2012-059580 A | 3/2012 |
| JP | 2012-209274 A | 10/2012 |
| JP | 2012-526442 T | 10/2012 |
| JP | 2012-253047 A | 12/2012 |
| JP | 2013-003911 A | 1/2013 |
| WO | WO 94/09527 | 4/1994 |
| WO | WO 2006/038169 A1 | 4/2006 |
| WO | WO 2010/044293 A1 | 4/2010 |
| WO | WO 2010/086757 A1 | 8/2010 |
| WO | WO 2010/116283 A2 | 10/2010 |
| WO | WO 2010/116283 A3 | 10/2010 |
| WO | WO 2010/128422 A1 | 11/2010 |
| WO | WO2012/022966 | 2/2012 |
| WO | WO 2015/061542 A1 | 4/2015 |
| WO | WO 2018/068055 A1 | 4/2018 |

OTHER PUBLICATIONS

International Search Report and Written Opinion issue by the International Searching Authority for Application No. PCT/US2014/061923, dated Feb. 5, 2015, 9 pages.
Extended European Search Report issued by the European Patent Office for Application No. 14856577.3, dated Jun. 28, 2017, 12 pages.
Office Action issued by the Mexican Patent Office for Application No. MX/a/2016/007966, dated Jan. 26, 2018, 4 pages (Non-English).
Office Action issued by the Mexican Patent Office for Application No. MX/a/2016/007966, dated Jul. 14, 2017, 3 pages (Non-English).
Office Action issued by the Mexican Patent Office for Application No. MX/a/2016/007966, dated Nov. 23, 2016, 2 pages (Non-English).
International Search Report and Written Opinion for International Application No. PCT/US2013/33377, dated May 29, 2013, 8 pages.
Extended European Search Report for European Application No. 13764767.3, dated Oct. 30, 2015, 7 pages.
Japanese Office Action dated Apr. 12, 2016 for JP 2015-501919 (3 page non-English and 4 page English translation).
Chinese Office Action dated Jun. 13, 2016 for CN 201380022436.4, 9 pages.
Non-Final Office Action issued by The United States Patent and Trademark Office for U.S. Appl. No. 15/012,244, dated Jun. 16, 2017, 16 pages.
Japanese Office Action dated Oct. 25, 2019 for JP 2016-234814, (5 page non-English and 6 page English translation).
Non-Final Office Action issued by The United States Patent and Trademark Office for U.S. Appl. No. 13/848,667, dated Feb. 26, 2015, 15 pages.
Non-Final Office Action issued by The United States Patent and Trademark Office for U.S. Appl. No. 14/521,884, dated May 19, 2017, 21 pages.
Office Action issued by The United States Patent and Trademark Office for U.S. Appl. No. 14/521,884, dated Sep. 2, 2016, 14 pages.
Office Action issued by The United States Patent and Trademark Office for U.S. Appl. No. 14/521,884, dated Jan. 25, 2016, 13 pages.
Office Action issued by The United States Patent and Trademark Office for U.S. Appl. No. 14/521,884, dated May 6, 2015, 18 pages.
Extended European Search Report issued by the European Patent Office for Application No. 16789997.0, dated Feb. 21, 2019, 12 pages.
International Search Report and Written Opinion issue by the International Searching Authority for Application No. PCT/US2016/030729, dated Aug. 12, 2016, 7 pages.
Office Action issued by The United States Patent and Trademark Office for U.S. Appl. No. 15/146,369, dated Mar. 17, 2017, 19 pages.

Final Office Action issued by The United States Patent and Trademark Office for U.S. Appl. No. 15/146,369, dated Dec. 8, 2017, 21 pages.
Examination Report issued by the Australian Patent Office for Application No. 2016210603, dated May 2, 2017, 3 pages.
Examination Report issued by the Australian Patent Office for Application No. 2013235059, dated Dec. 18, 2015, 3 pages.
Notice of Reasons for Rejection issued by the Japanese Patent Office for Application No. 2016-234814, dated Nov. 24, 2017, 5 page non-English and 6 page English language.
Examination Report issued by the Australian Patent Office for Application No. 2017258941, dated Dec. 24, 2018, 3 pages.
Office Action issued by the European Patent Office for Application No. 16789997.0, dated Dec. 12, 2017, 3 pages.
Office Action issued by the Chinese Patent Office for Application No. 201480065234.2, dated Nov. 24, 2017 (12 pages Non-English and 18 page English translation).
International Search Report and Written Opinion issued by the International Searching Authority for Application No. PCT/US2017/055982, dated Dec. 29, 2017, 12 pages.
Final Office Action issued by The United States Patent and Trademark Office for U.S. Appl. No. 14/521,884, dated Mar. 8, 2018, 25 pages.
Office Action issued by the European Patent Office for Application No. 14856577.3, dated Apr. 26, 2018, 6 pages.
Office Action issued by the European Patent Office for Application No. 14856577.3, dated Mar. 3, 2020, 8 pages.
Office Action issued by the European Patent Office for Application No. 14856577.3, dated Apr. 16, 2019, 7 pages.
Examination Report No. 1 issued by the Australian Patent Office for Application No. 2014340037, dated May 15, 2018, 3 pages.
Examination Report No. 2 issued by the Australian Patent Office for Application No. 2014340037, dated Apr. 9, 2019, 3 pages.
Final Office Action issued by The United States Patent and Trademark Office for U.S. Appl. No. 15/012,244, dated Apr. 16, 2018, 17 pages.
Office Action issued by the Mexican Patent Office for Application No. MX/a/2016/005249, dated May 24, 2018, 4 pages (Non-English).
Office Action issued by the Mexican Patent Office for Application No. MX/a/2016/005249, dated Jan. 24, 2019, 4 pages (Non-English).
Office Action issued by the Japanese Patent Office for Application No. 2016-523953 dated Jul. 11, 2018, and received on Jul. 19, 2018, (6 page non-English and 7 page English translation).
Advisory Action issued by The United States Patent and Trademark Office for U.S. Appl. No. 14/521,884, dated Jul. 31, 2018, 8 pages.
Office Action issued by The United States Patent and Trademark Office for U.S. Appl. No. 14/521,884, dated Sep. 26, 2018, 21 pages.
Office Action issued by the Chinese Patent Office for Application No. 201480065234.2, dated Aug. 2, 2018, (3 pages Non-English).
Office Action issued by the Mexican Patent Office for Application No. MX/a/2016/007966, dated Aug. 17, 2018, 8 pages (Non-English).
Non-Final Office Action issued by The United States Patent and Trademark Office for U.S. Appl. No. 15/012,244, dated Nov. 30, 2018, 25 pages.
Non-Final Office Action issued by The United States Patent and Trademark Office for U.S. Appl. No. 15/729,567, dated Dec. 11, 2018, 22 pages.
Office Action issued by the Canadian Patent Office for Application No. 2,867,856 dated Nov. 30, 2018, 3 pages.
Office Action issued by the Japanese Patent Office for Application No. 2016-234814 dated Nov. 2, 2018, 6 pages.
Non-Final Office Action issued by The United States Patent and Trademark Office for U.S. Appl. No. 15/729,567, dated Sep 5, 2019, 17 pages.
Final Office Action issued by The United States Patent and Trademark Office for U.S. Appl. No. 15/012,244, dated Sep. 9, 2019, 10 pages.
Examination Report issued by the Canadian Patent Office for Application No. 2,867,856 dated Dec. 9, 2019, 8 pages.

(56) References Cited

OTHER PUBLICATIONS

Office Action issued by the Chinese Patent Office for Application No. 201710871680.8, dated Nov. 19, 2019 (7 pages Non-English and 6 page English translation).
Office Action issued by the European Patent Office for Application No. 16789997.0, dated Jan. 2, 2020, 7 pages.
Extended European Search Report issued by the European Patent Office for Application No. 17859324.0, dated Mar. 30, 2020, 8 pages.
Examination Report No. 1 issued by the Australian Patent Office for Application No. 2019216715, dated Jun. 27, 2020, 3 pages.
Office Action issued by the Chinese Patent Office for Application No. 201680032959.0, dated Jul. 29, 2020 (6 page Non-English and 6 page English translation).
Office Action issued by the Chinese Patent Office for Application No. 201710871680.8, dated Aug. 3, 2020 (3 page Non-English and 4 page English translation).
Japanese Office Action dated Aug. 31, 2020, for JP 2019-118866, (6 page non-English and 7 page English translation).
Office Action issued by the European Patent Office for Application No. 17166893.2, dated Sep. 11, 2020, 3 pages.
Office Action issued by the Chinese Patent Office for Application No. 201910418570.5, dated Sep. 28, 2020 (9 pages Non-English only).
Examination Report issued by the Canadian Patent Office for Application No. 2,867,856 dated Oct. 13, 2020, 4 pages.
Office Action issued by the Canadian Patent Office for Application No. 2,927,854 dated Dec. 2, 2020, 6 pages.
Examination Report issued by the Australian Patent Office for Application No. 2020201417, dated Mar. 31, 2021, 6 pages.
Office Action issued by the Chinese Patent Office for Application No. CN201910418570.5 dated May 7, 2021, 6 pages.
Office Action issued by the Japanese Patent Office for Application No. JP 2020-084458 dated May 13, 2021, 18 pages.
Office Action issued by the Japanese Patent Office for Application No. JP 2019-118866 dated Jun. 8, 2021, 9 pages.
Examination Report issued by the Australian Patent Office for Application No. 2017339544, dated Aug. 3, 2021, 3 pages.
Office Action issued by the Japanese Patent Office for Application No. JP 2019-515907 dated Sep. 21, 2021, (6 page Non-English and 7 page English translation).
Office Action issued by the Canadian Patent Office for Application No. 2,927,854 dated Sep. 17, 2021, 5 pages.
Office Action issued by the European Patent Office for Application No. 16789997.0, dated Jul. 13, 2021, 4 pages.
Office Action issued by the European Patent Office for Application No. 17859324.0, dated Oct. 12, 2021, 5 pages.

\* cited by examiner

WIRELESS SENSOR SYSTEM, METHOD AND APPARATUS WITH SWITCH AND OUTLET CONTROL

CROSS-REFERENCE TO RELATED APPLICATION

This application is a continuation of U.S. patent application Ser. No. 15/012,244, now U.S. Pat. No. 10,638,399, entitled "Wireless Sensor System, Method and Apparatus with Switch and Outlet Control," filed Feb. 1, 2016, which is a continuation of U.S. patent application Ser. No. 13/848,667, now U.S. Pat. No. 9,251,699, entitled "Wireless Sensor System, Method and Apparatus with Switch and Outlet Control," filed Mar. 21, 2013, which claims priority to and the benefit of U.S. Provisional Application No. 61/613,753, entitled "Wireless Sensor System with Switch and Outlet Control," filed Mar. 21, 2012; the disclosures of which are incorporated by reference herein in their entireties.

BACKGROUND

Some embodiments described herein relate generally to wireless sensor systems, methods and apparatus with switch and outlet control.

Known systems exist for remotely controlling power to switches and outlets. Such system, however, may use long cabling runs to control an individual switch or outlet. Other known system may frequently use battery power, causing rapid depletion of onboard batteries and/or may use additional cabling to provide power to local switch and outlet controllers.

Thus, a need exists for a wireless sensor systems, methods and apparatus with switch and outlet control.

SUMMARY

In some embodiments, an apparatus includes a wireless sensor configured to be operatively coupled to a network gateway device that is configured to receive one of a first data packet or a second packet from the wireless sensor. The wireless sensor is configured to send the first data packet at a first time on a first frequency, the first data packet including a payload associated with a value of a measurement that was measured by the wireless sensor. The wireless sensor is configured to send the second data packet at a second time on a second frequency, the second data packet includes a payload associated with the value.

DETAILED DESCRIPTION

Figure 1:
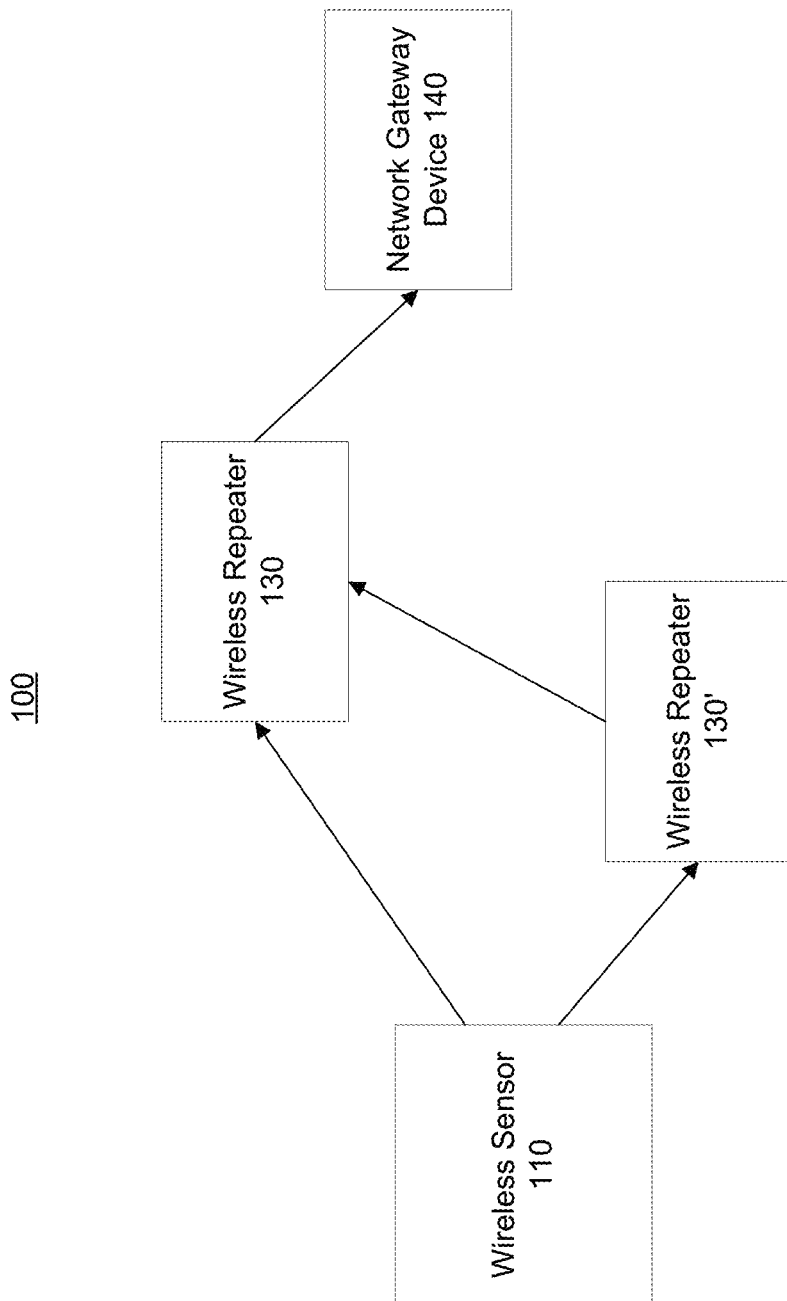
FIG. 1 is a schematic illustration of a wireless sensor system according to an embodiment.

In some embodiments, an apparatus includes a wireless sensor configured to be operatively coupled to a network gateway device that is configured to receive one of a first data packet or a second packet from the wireless sensor. The wireless sensor is configured to send the first data packet at a first time on a first frequency, the first data packet including a payload associated with a value of a measurement that was measured by the wireless sensor. The wireless sensor is configured to send the second data packet at a second time on a second frequency, the second data packet includes a payload associated with the value.

In some embodiments, the wireless sensor is further configured to be operatively coupled to a wireless repeater that is configured to receive the first data packet or the second data packet. In some embodiments, the wireless repeater has a buffer to store at least one of the first data packet or the second data packet for an amount of time. In some embodiments, the wireless repeater is a first wireless repeater, and the first wireless repeater discards the first data packet based on the payload of the first data packet being the same as the payload of the second data packet when the second data packet has been sent from a second wireless repeater and the first data packet is stored in a buffer of the wireless repeater.

In some embodiments, the wireless repeater adds a received signal strength value to the first data packet or the second data packet when the first data packet or the second data packet is received. In some embodiments the second time is after the first time, substantially no delay occurs after the first time and before the second time. In some embodiments the wireless sensor is configured to send the first data packet and the second data packet independent of an instruction from the network gateway device. In some embodiments, the wireless sensor is configured to be operatively coupled to a wireless repeater that (1) receives the first data packet via a first antenna associated with a first transceiver and (2) receives the second data packet via a second antenna associated with a second transceiver. In some embodiments the wireless sensor is configured to be coupled to the network gateway device that (1) selects a first antenna or a second antenna, based on received signal strength, to receive the first data packet, and (2) selects a third antenna or a fourth antenna, based on received signal strength, to receive the second data packet.

In some embodiments, an apparatus includes a wireless sensor configured to be operatively coupled to a network gateway device. The wireless sensor transmits a first data packet at a first time on a first frequency and a second data packet at a second time on a second frequency. The apparatus includes at least one wireless repeater configured to retransmit the first data packet and the second data packet. The wireless repeater has a first antenna associated with a first transceiver and a second antenna associated with a second transceiver. The first antenna and first transceiver are configured to receive the first data packet, and the second antenna and second transceiver are configured to receive the second data packet. The apparatus includes a network gateway device configured to receive one of the first data packet or the second data packet.

In some embodiments at least one wireless repeater including a buffer to store at least one of the first data packet or the second data packet for an amount of time. In some embodiments at least one wireless repeater is configured to add a received signal strength value to the first data packet or the second data packet when the first data packet or the second data packet is received. In some embodiments the second time is after the first time, substantially no delay occurs after the first time and before the second time. In some embodiments the wireless sensor is configured to send the first data packet and the second data packet independent of an instruction from the network gateway device.

In some embodiments, an apparatus includes a wireless sensor including an antenna portion and configured to be operatively coupled, via the antenna portion, to a network gateway device. The wireless sensor includes a housing configured to be at least partially disposed within an electrical enclosure. The wireless sensor is configured to send, to the network gateway device a signal indicative of a value of a characteristic of the wireless sensor.

In some embodiments the wireless sensor is configured to send the signal using a dipole antenna. In such embodiments the antenna portion is a first half of the dipole antenna and a metal portion of the electrical enclosure is a second half of the dipole antenna. In some embodiments the wireless sensor is configured to send the signal using an antenna. In such embodiments, the antenna portion is a monopole element of the antenna and a metal portion of the electrical enclosure is a ground plane for the monopole element. In some embodiments a ground of the wireless sensor is isolated from the electrical enclosure by a dielectric. In some embodiments the antenna portion of the wireless sensor is configured to be operatively coupled to a metal portion of the junction box that is an antenna ground plane. In some embodiments the wireless sensor is configured to be operatively coupled to a battery disposed within the housing. In some embodiments the wireless sensor includes an energy harvester device separate from an energy source associated with the junction box. In some embodiments the characteristic is an energy usage. In some embodiments the wireless sensor includes an alternating current outlet. In some embodiments the wireless sensor includes an alternating current switch. In some embodiments the characteristic is a status of the switch.

A wireless sensor system can be used to measure and monitor environmental characteristics of, for example, a room of a building, characteristics of a wireless sensor itself, for example, whether a plug is in use, and/or to effect a characteristic of a room or the wireless sensor. By way of example, a wireless sensor can include a light or outlet switch configured to sense and/or control whether an electrical switch controlling a light or outlet is opened or closed. In another example, a wireless sensor can include carbon monoxide sensor configured to measure a level of carbon monoxide in an area. In some embodiments, aspects of a wireless sensor system can be retrofitted into an existing system without the need to make additional changes to the existing system. For example, a light switch type wireless sensor described herein can replace an existing light switch without the need to add additional wiring, replace junction boxes, etc.

As used in this specification, the singular forms "a," "an" and "the" include plural referents unless the context clearly dictates otherwise. Thus, for example, the term "a data packet" is intended to mean a data packet or a combination of data packets.

FIG. 1 is a schematic illustration of a wireless sensor system ("system") 100 according to an embodiment, system 100 includes a wireless sensor 110. In some embodiments, at least a portion of the wireless sensor 110 may be disposed within an electrical enclosure (not shown). System 100 includes a wireless repeater 130, a wireless repeater 130', and a network gateway device 140.

System 100 includes a wireless sensor 110 that is configured to measure a characteristic of wireless sensor 110 and/or of a room with which wireless sensor 110 is located. In some embodiments, wireless sensor 110 can include an environmental sensor, for example, to measure a temperature, pressure, carbon gas levels, humidity etc. In some embodiments, wireless sensor 110 can include an area sensor, for example, to measure motion, light level, proximity, touch, etc. In some embodiments, wireless sensor 110 can include an electrical sensor, for example, to measure and/or control an energy usage, switch state, outlet state, etc. In some embodiments, at least a portion of wireless sensor 110 can be disposed within the electrical enclosure. In some embodiments, an electrical enclosure can be a standard electrical junction box, for example, a metal and/or plastic box that is configured to be disposed in and/or on a wall and/or other support, and that is configured to house one or more electrical connections and/or associated components, for example, switches, outlets, etc. In some embodiments, the electrical enclosure can generally be any enclosure normally used to house AC or DC wiring electrical connections, such as grounded enclosures (e.g. light fixtures, breaker boxes, distribution panels, etc.). In some embodiments, wireless sensor 110 can include a sensor module (not shown in FIG. 1), processor module (not shown in FIG. 1), a first radio module (not shown in FIG. 1), a second radio module (not shown in FIG. 1), a first antenna (not shown in FIG. 1), a second antenna (not shown in FIG. 1). In some embodiments, wireless sensor 110 can include a battery (not shown), a switch (not shown), an analog-to-digital converter (not shown), ports (not shown), interfaces (not shown), etc. In some embodiments, wireless sensor 110 can operate as a wireless repeater, for example, similar to wireless repeater 130 described below, for other wireless sensors.

Wireless sensor 110 can include the sensor module to measure a value of a characteristic of wireless sensor 110 and/or an environment within which wireless sensor 110 is located. For example, the sensor module can measure an environmental value (temperature, pressure, motion etc), a motion and/or occupancy value, and/or a characteristic and/or state of an electrical component associated with wireless sensor 110 (open or closed light switch, electrical outlet plugged in or in use, etc). In some embodiments, the sensor module can be included in the processor module. The sensor module can measure the value at a predetermined time and/or on a predetermined schedule, in response to an event, etc. The sensor module can provide the value of a measurement to the processor module. In some embodiments, sensor module 110 can include a clock module (not shown) to prompt a measurement based on the predetermined time and/or schedule. In such embodiments, the clock module can include a "loose tolerance" of between about 5-10%. In such an embodiment, the clock module can include an RC based oscillator to implement the loose tolerance. In such embodiments, the RC based oscillator can be included in the processor module. In this manner, a system 100 that includes more than one wireless sensor 110 that each includes a clock module having substantially the same setting can, via radio/antenna sets, send signals at different times to reduce communication collisions. In some such embodiments, the clock can determine when a measurement is taken and/or when a data packet including the value of the measurement is sent. The predetermined time for measuring a value and/or transmitting an associated packet can be programmed, user adjustable via an input device, event driven, randomly derived, or set by network gateway device 140.

Wireless sensor 110 can include a processor module to define at least one data packet including values associated with measurements of the sensor module. The sensor module can define one or more copies of the one or more data packets. A data packet can include sensor data (e.g. value of measurement taken by the sensor module), control data (e.g. a switch has been opened or closed), control requests (e.g. should a switch be opened or closed), network identification information (e.g. node identification number, network identification number), security information (e.g. data encryption key), etc. The processor module can include a computer processor or microprocessor and/or memory, for example a random access memory (RAM), a memory buffer, a hard drive, a database, an erasable programmable read-only memory (EPROM), an electrically erasable read-only memory (EEPROM), and/or so forth. Memory can be used to hold data such as, but not limited to, schedules, set points, instructions, etc. for use to control or communicate data to wireless sensor 110, repeaters 130, 131', or network gateway device 140. In this manner, the processor module stores and sends the at least one data packet and the one or more copies of the at least one data packet to the first radio and/or to the second radio at different times. In this manner, wireless sensor 110 can send a data packet, which may include the value of the measurement, control data, control requests etc, at more than one time and from more than one antenna.

Wireless sensor 110 can include one or more transmitter sets, for example a first transmitter set (e.g, the first radio and the associated first antenna), and a second transmitter set (e.g., the second radio and associated second antenna), to transmit data packets including a value of a measurement, control data, control requests etc from wireless sensor 110 to, for example, wireless repeaters 130, 130'. A transmitter set can transmit a data packet using any modulation type, for example Direct Sequence Spread Spectrum (DSSS) or Frequency Hopping Spread Spectrum (FHSS). In some embodiments, a hybrid DSSS and FSSS system, frequency hopping direct sequence spread spectrum (FHDSSS), can be used spreading data packets across both frequency and time to reduce the probability of interference from other transmitter sets (e.g., within wireless sensor 110, another wireless sensor, or another device including a transmitter set). In a hybrid system, the data packet can be transmitted using a DSSS signal that can be hopped from channel to channel to increase robustness. In some embodiments, the first antenna and/or the second antenna can be a dipole (e.g., omnidirectional) antenna or can be a patch (e.g., directional) antenna.

In some embodiments, each transmitter set of wireless sensor 110 can operate on a different channel substantially simultaneously. In some embodiments, a transmitter set of wireless sensor 110 can operate on two or more different channel sequentially. In this manner, wireless sensor 110 may not need to verify that other components of system 100 are operating on a particular channel. In other words, by sending a copy of a data packet on multiple channels of system 100, the other components of system 100 should receive at least one of the data packet and/or the copies of the data packet. In some such embodiments, and as discussed below, other components of system 100 can include multiple transmitter sets, such that those components can receive at least one of the data packet and/or copies of the data packet. In such embodiments, an amount of energy used to send a data packet and/or copies of a data packet at multiple times and/or on multiple channels can be lower than the energy used to verify a component is operating on a particular channel. In such embodiments, a first channel and a second channel can be substantially opposite ends of the frequency band to maximize the probability that any source of potential interference is avoided by the other channel. As an example wireless sensor 110 can transmit, substantially simultaneously or sequentially, on a first channel at 903 MHz and on a second channel at 927 MHz in the 902-928 MHz band.

In some embodiments, and as described above, wireless sensor 110 can send a data packet and/or copies of the data packet on two or more channels and at two or more times. In such embodiments, wireless sensor 110 can be in a sleep mode (or other low power or zero power mode of operation) for a portion of the time to conserve the power of a power supply (e.g., battery). At the predetermined interval and/or schedule, wireless sensor 110 can awake from the sleep mode and can be in an active mode. Wireless sensor 110 can measure a value of a characteristic and define a data packet including the value. Wireless sensor 110 can define a data packet including control data or control requests. In such embodiments, as discussed above, wireless sensor 110 can send a data packet via a first transmitter set at a first time, and then send a first copy of the data packet from the first transmitter set at a second time, after the first time. In such embodiments, wireless sensor 110 can send a second copy of the data packet via a second transmitter set at a third time, and then send a third copy of the data packet from the second transmitter set at a fourth time, after the third time.

In some embodiments, wireless sensor 110 can receive data for setup of system 100, including a network ID, security features, and a wireless sensor identification numbers. In some embodiments, after the setup of system 100, wireless sensor 110 can be designated as a transmit-only wireless sensor. In some embodiments, wireless sensor 110 can periodically send a status request data packet to network gateway device 140, via wireless repeater 130 and wireless repeater 130' if necessary, and can be designated as a transmit/receive device to receive commends.

System 100 includes wireless repeater 130 configured to receive data packets from wireless sensor 110 and/or wireless repeater 130', and to send data packets to network gateway device 140. System 100 includes wireless repeater 130', similar to wireless repeater 130, and configured to receive data packets from wireless sensor 110 and to send data packets to wireless repeater 130. Wireless repeaters 130,130' can include a computer/micro processor or microprocessor and/or memory, for example a random access memory (RAM), a memory buffer, a hard drive, a database, an erasable programmable read-only memory (EPROM), an electrically erasable read-only memory (EEPROM), and/or so forth. Memory may be used to hold data such as, but not limited to, schedules, set points, instructions, etc. for use to control or communicate data to wireless sensor 110, repeaters 130, 131', or network gateway device 140. In this manner, wireless repeaters 130, 130' can store received data packets for a predetermined period of time in a buffer. In some embodiments, the buffer of a wireless repeater can store a received data packet and can compare the data packet to other data packets in the buffer and/or data packets that have been recently received and/or forwarded. In such embodiments, the wireless repeater can discard duplicate data packets. By way of example, wireless repeater 130 can receive a first data packet from wireless sensor 110, and can receive a second data packet, identical to the first data packet, from wireless sensor 110 via wireless repeater 130'. In such embodiments, wireless repeater 130 can discard either the first data packet or the second data packet, for example, based on which was received first (e.g., first in first out, "FIFO"), which has a stronger received signal strength, and/or another metric. In some embodiments, wireless repeater 130 can discard packets after a period of time, for example 5 seconds.

Wireless repeaters 130,130' can include at least one transmitter set to receive and/or send signals, including data packets. In some embodiments, wireless repeaters 130,130' can include at least the same number of transmitter sets as wireless sensor 110. In this manner, wireless repeaters 130,130' can send and receive any data packet sent from wireless sensor 110. By way of example, wireless sensor 110 can include a first transmitter set sending data packets on a first channel and at a first time and a second time, and can include a second transmitter set sending data packets on a second channel and at a third time and a fourth time. In such an example, wireless repeaters 130,130' can include a first transmitter set operating on the first channel and a second transmitter set operating on the second channel such that either of wireless repeaters 130,130' can receive four copies of a data packet. By way of example, wireless sensor 110 can include a first transmitter set sending data packets on a first channel at a first time and second channel at a second time. In such an example, wireless repeaters 130,130' can each include a first transmitter set operating on the first channel and a second transmitter set operating on the second channel such that either of wireless repeaters 130,130' can receive two copies of a data packet without a need to switch between the channels. In such an example, the system 100 can include multiple frequencies, multiple times, multiple data paths, and multiple antennas, i.e. the system 100 has frequency diversity, time diversity, spatial diversity, and antenna diversity. Said another way, the system 100 has concurrent frequency, time, spatial, and antenna diversity. By way of another example, wireless repeaters 130,130' can each include a first transmitter set sending or receiving data packets on a first channel at a first time and a second transmitter set sending or receiving data packets on a second channel at a second time. In such an example, the first time and the second time may overlap.

In some embodiments, wireless repeaters 130,130' can calculate a received signal strength indication (RSSI) upon receipt of a data packet. In such embodiments, wireless repeaters 130,130' can add this data to the data packet, for example, at the end of a data packet payload. In this manner, network gateway device 140 can examine the RSSI data for each hop between wireless sensor 110 and network gateway device 140. In some such embodiments, network gateway device 140 can use the added data to determine a number of hops between wireless sensor 110 and network gateway device 140. In such embodiments, network gateway device 140 can compare the number of hops actually used to an expected number of hops, for example, to determine an efficiency and/or health of system 100.

System 100 includes network gateway device 140 configured to receive data packets from wireless repeater 130, 130' or directly from wireless sensor 110. Network gateway device 140 can receive data packets using a wireless protocol, for example, with one or more transmitter sets, and can convert the data packets to a wired protocol for further transmission via a wired network (not shown) coupled to the network gateway device 140. By way of example, network gateway device 140 can transform data packets received in a wireless format, for example 802.15.4, WiFi, cellular (GSM, CDMA, etc.), or satellite, and convert them into a different wireless protocol and/or a wired protocol such as 1) Ethernet: BACnet/IP, BACnet/Ethernet, Modbus TCP, Ethernet/IP, Omron FINS, DNP3, SNMP, XML 2) RS-485: BACnet/MSTP, Metasys N2, Modbus RTU, JBus, DNP, YorkTalk, Allen Bradley DF1, and 3) FTT-10: LonWorks. In some embodiments, network gateway device 140 can convert the data packets to a wireless protocol for further transmission via a wireless network (not shown) such as for example 802.15.4, WiFi, cellular (GSM, CDMA, etc.), or satellite wireless networks. In such embodiments, network gateway device or wireless repeaters can have one or more input/outputs, each input/output configured to operate using a different protocol. By way of example, with respect to a building, network gateway device 140 can include a first input/output operating using the BACnet/IP protocol for communication with a building heating, ventilation, and air conditioning system, can include a second input/output operating using the TCP/IP protocol for communication via a network, such as the internet, for viewing on a browser based page, and can include a third input/output operating using a serial bus connection (e.g., universal serial bus) for local (e.g., at network gateway device 140) communication, configuration, etc. The input/outputs can be used, for example, for monitoring, graphing, alarming (via email, text message, or other method), setup of the wireless network, etc.

Similar to wireless repeaters 130,130' described above, in some embodiments, network gateway device 140 can include the same number of transmitter sets as wireless sensor 110 and/or wireless repeaters 130,130'. In this manner, network gateway device 140 can send and/or receive any data packet sent from wireless sensor 110 and/or from wireless repeaters 130,130'. Similar to wireless repeaters 130,130' and wireless sensor 110, network gateway device 140 can include a computer/micro processor and/or memory, for example a random access memory (RAM), a memory buffer, a hard drive, a database, an erasable programmable read-only memory (EPROM), an electrically erasable read-only memory (EEPROM), and/or so forth. Memory can be used to hold data such as, but not limited to, schedules, set points, instructions, etc. for use to control or communicate data to wireless sensor 110, repeaters 130, 131', or network gateway device 140. In this manner, the network gateway device 140 can store and send data packets, for example prior to and/or after conversion from a first protocol to a second protocol, as described above, or in response to data received from the one or more input/outputs.

In some embodiments, network gateway device 140 can coordinate the frequency of the channel (or channels for multiple transmission set embodiments) at which wireless sensor 110 and wireless repeaters 130,130' operate. In such embodiments, network gateway device can transmit a periodic instruction to switch channel(s) and/or network ID. In such an embodiment, network gateway device 140 can send such an instruction, for example, every ten seconds. In some embodiments, whether an instruction is sent, for example to change channel(s), and what the instruction includes, can be based on the health of the network, for example the number of hops a data packet takes, the RSSI of data packet transmissions, etc. In some embodiments, network gateway device 140 can coordinate the security of the wireless system 100 by transferring security data, wirelessly or via a wired connection, such as a security key, to the wireless sensor 110 and wireless repeaters 130,130'.

Figure 2:
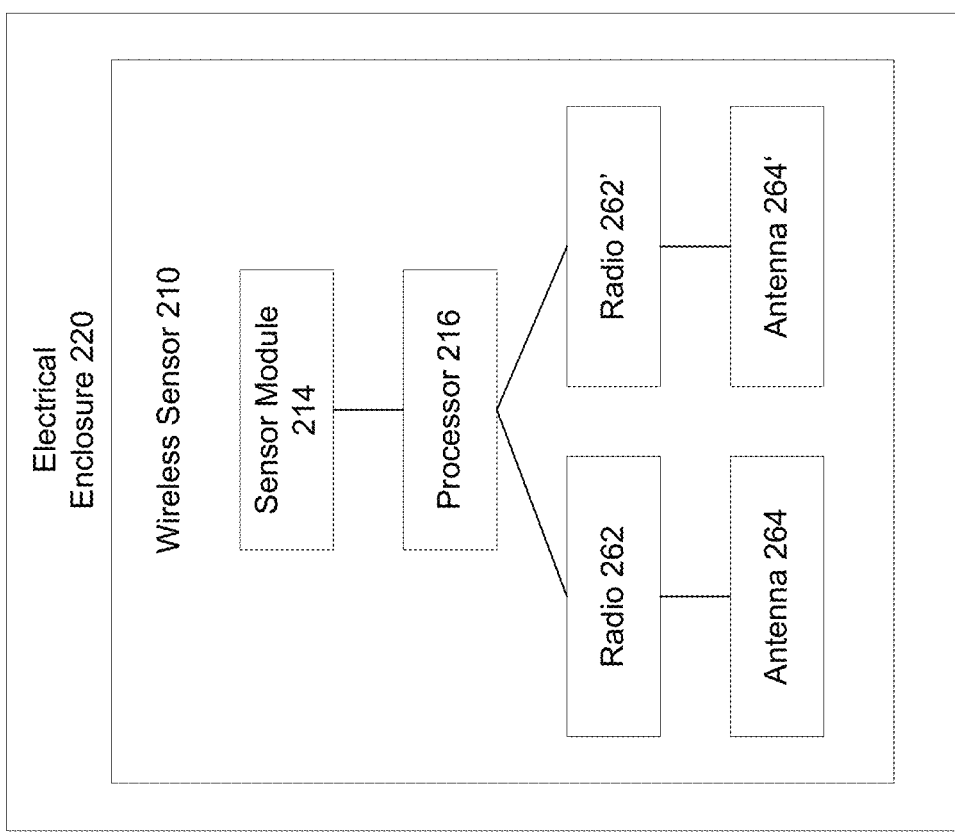
FIG. 2 is a schematic illustration of a wireless sensor and junction box according to an embodiment.

FIG. 2 is a schematic illustration of a wireless sensor 210 at least partially disposed within an electrical enclosure 220. Wireless sensor 210 can be similar to and can include similar components to wireless sensor described above. For example, wireless sensor 210 can include a processor 216 that can be similar to the processor described above with respect to wireless sensor 110. Wireless sensor 210 includes a sensor module 214, the processor 216, a radio 262, a radio 262', an antenna 264, and an antenna 264'. In some embodiments, radio 262, 262' can include more than one antenna, for example, radio 262 includes antenna 264 and can include a second antenna (not shown). In such an embodiment, wireless sensor 210 can select whichever of antenna 264 or the second antenna has a stronger RSSI for use by radio 262.

Figure 3:
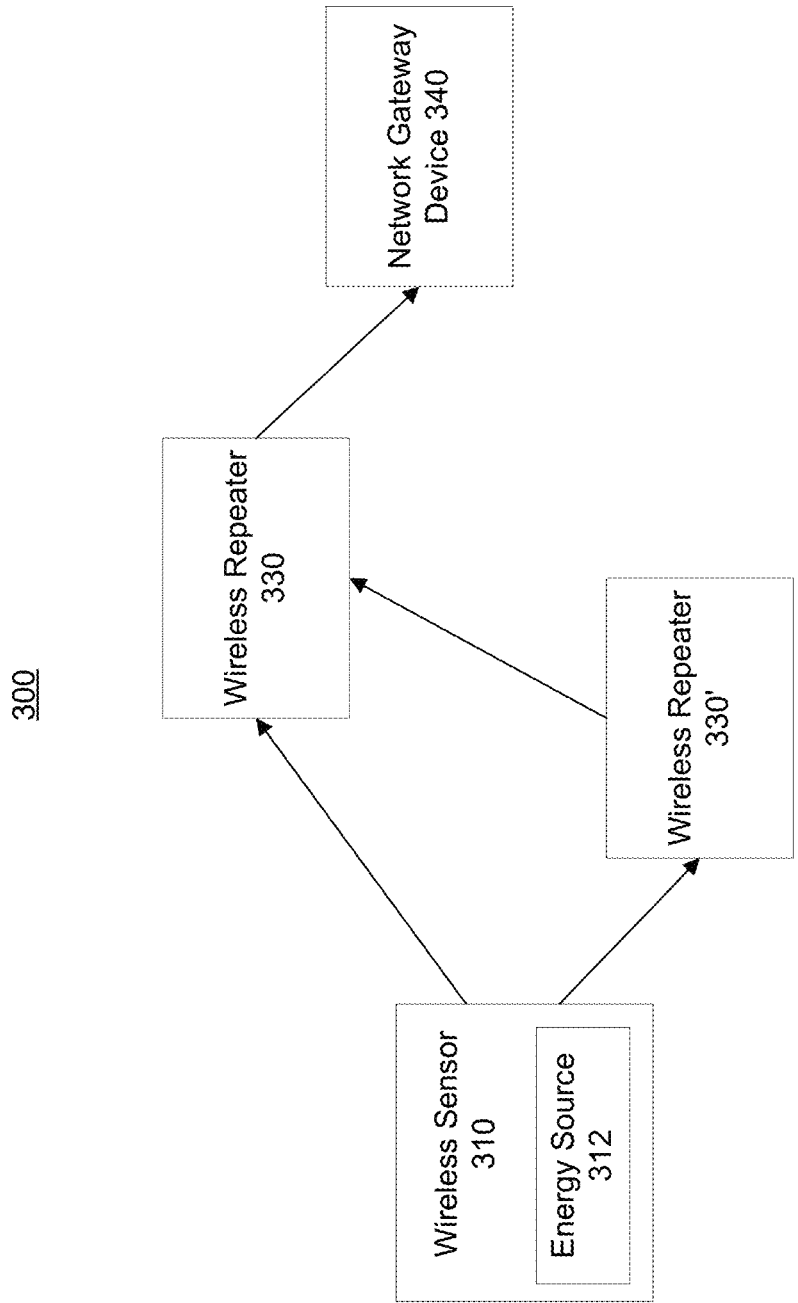
FIG. 3 is a schematic illustration of a wireless sensor system according to an embodiment.

FIG. 3 is a schematic illustration of a wireless sensor system ("system") 300 according to an embodiment, system 300 can be similar to system 100 and can include similar components. For example, system 300 includes a wireless sensor 310 that is similar to wireless sensor 110 and at least a portion of which can be disposed within an electrical enclosure (not shown). System 300 includes a wireless repeater 330, a wireless repeater 330', and a network gateway device 340. Unlike wireless sensor 110 as shown in FIG. 1, wireless sensor 310 includes an energy source 312 configured to supply wireless sensor 310 with energy independent of an energy supply (not shown) of the electrical enclosure 320. In some embodiments, energy source 312 can include a battery, for example battery using stable battery chemistry, such as Lithium Thionyl Chloride or Lithium Iron Disulfide, that can chemically last up to and beyond 25 years. In some embodiments, energy source 312 can include an energy harvester, alone or in combination with a battery. In some embodiments, an energy harvesting device can be, for example, similar to an energy harvesting device described in U.S. Pat. No. 7,868,482, entitled "METHOD AND APPARATUS FOR HIGH EFFICIENCY RECTIFICATION FOR VARIOUS LOADS," which is incorporated by reference herein.

Figure 4:
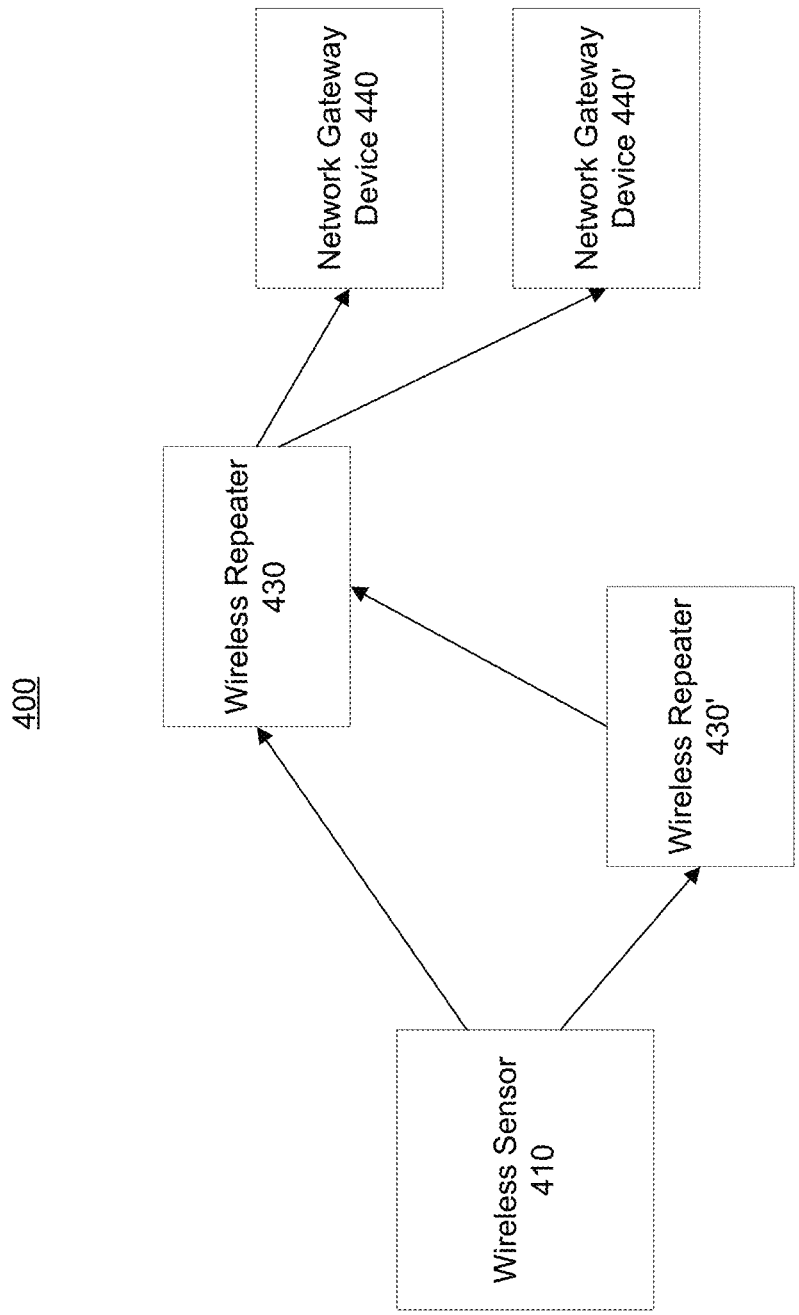
FIG. 4 is a schematic illustration of a wireless sensor system according to an embodiment.

FIG. 4 is a schematic illustration of a wireless sensor system ("system") 400 according to an embodiment. System 400 can be similar to system 100 and can include similar components. For example, system 400 includes a wireless sensor 410 that is similar to wireless sensor 110 and at least a portion of which can be disposed within an electrical enclosure (not shown). System 400 includes a wireless repeater 430, a wireless repeater 430', and a network gateway device 440. Unlike system 100 as shown in FIG. 1, system 400 includes a network gateway device 440'. In such embodiments, network gateway devices 440, 441' can be configured to receive data packets from wireless sensor 410 and wireless repeaters 430,430'. In this manner, if one of network gateway devices 440, 440' should fail, the other of network gateway devices 440, 440' can continue to operate. In some embodiments network gateway device 440 can be associated with a first wired network and network gateway device 440' can be associated with a second wired network, at least a portion of which can be different from the first wired network. In some embodiments, network gateway device 440 can be in communication with a portion of a set of wireless repeaters and/or wireless sensors (not shown in its entirety) of system 400, and network gateway device 440' can be in communication with a different portion of the set of wireless repeaters and/or wireless sensors of system 400. In such embodiments, either of wireless repeaters 430,430' can be included in the portion of the plurality of wireless repeaters and/or in the different portion of the set of wireless repeaters.

In some embodiments, it may be necessary to install a new network gateway device (not shown) or a second network gateway device (not shown) within the wireless sensor system. This can be performed using a listen mode initiated by a button press on the network gateway device 440,440' or by using a computer interface on the network gateway device 440,440' and graphical user interface. As an example, the wireless sensor 410 can be connected to the network gateway device 440,440' by connecting a mini-USB cable between the wireless sensor 410 and the network gateway device 440,440'. At this time, the network gateway device 440,440' will instruct the wireless sensor 410 via the cable to set the appropriate channel and network ID and assign the wireless sensor 410 a unique wireless sensor ID. If a network gateway device 440,440' ceases to operate, a new network gateway device 440,440' can be deployed by enabling listen mode to listen to the network for a predetermined period of time and store the IDs of all wireless sensors 410 and map the wireless sensor 410 data to the appropriate memory location.

Figure 5:
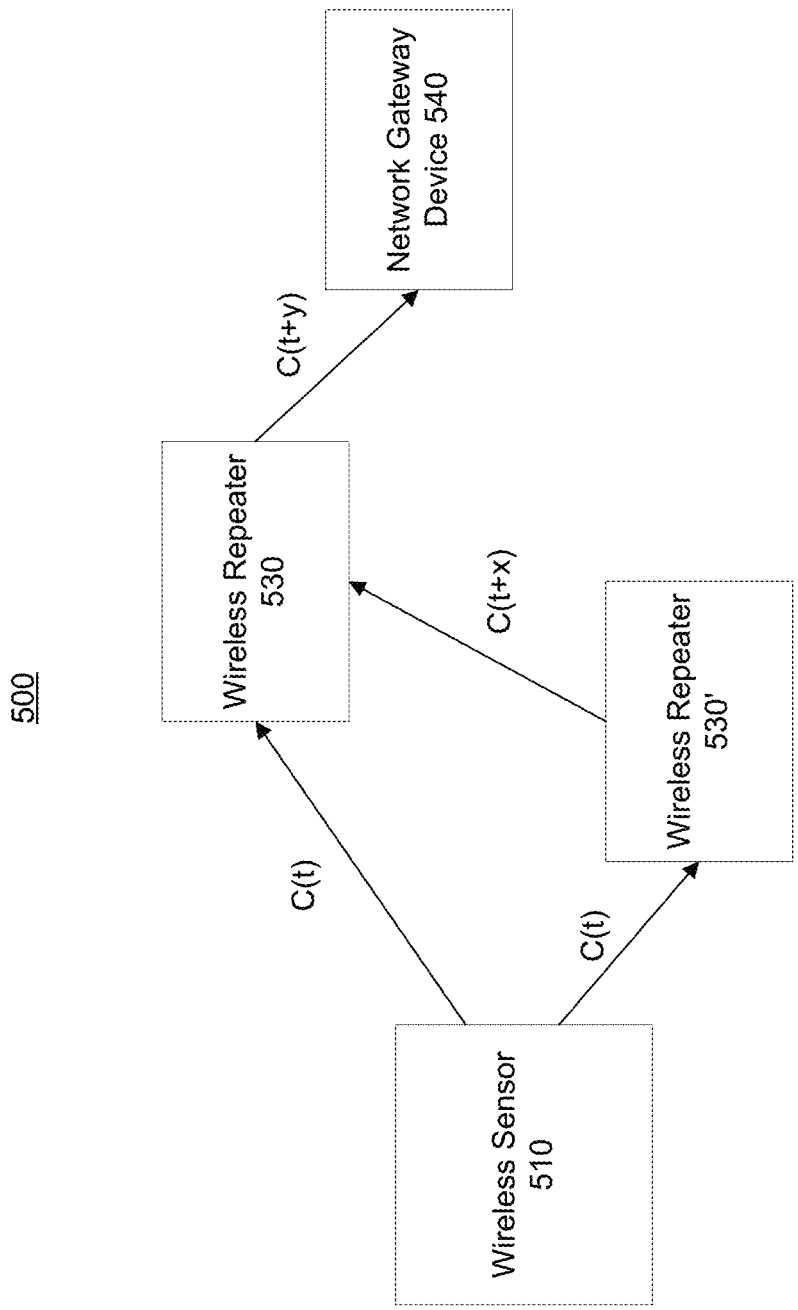
FIG. 5 is a schematic illustration of a wireless sensor system according to an embodiment.

FIG. 5 is a schematic illustration of a wireless sensor system ("system") 500 according to an embodiment. System 500 can be similar to system 100 and can include similar components. For example, system 500 includes a wireless sensor 510 that is similar to wireless sensor 110 and at least a portion of which can be disposed within an electrical enclosure (not shown). System 500 includes a wireless repeater 530, a wireless repeater 530', and a network gateway device 540. As shown in FIG. 5, wireless sensor 510 can send a data packet C at a time t, shown as C(t). Wireless repeater 530 can receive the data packet C from wireless sensor 510 and can determine by comparison to its buffer in memory that the data packet C has not been sent by wireless repeater 530. Wireless repeater 530 can randomly delay between about 25 ms to 100 ms and can then broadcast the data packet C packet at time (t+y), shown as C(t+y). In some embodiments, because data packet C is broadcast, wireless sensor 510 can receive data packet C, the receipt of which can be an acknowledgment of a successful transmission. In the example, wireless repeater 530' can receive data packet C and can determine by comparison to its buffer in memory that the packet has not been sent by wireless repeater 530'. Wireless repeater 530' can randomly delay between about 25 ms to 100 ms and can then broadcast the packet at time (t+x), shown as C(t+x). The packet C(t+x) can be received by wireless repeater 530. Wireless repeater 530 can compare data packet C(t+x) to its buffer in memory, can determined that data packet C(t+y), equivalent to data packet C(t+x) has already been sent, and can discard and/or otherwise ignore data packet C(t+x).

Figure 6:
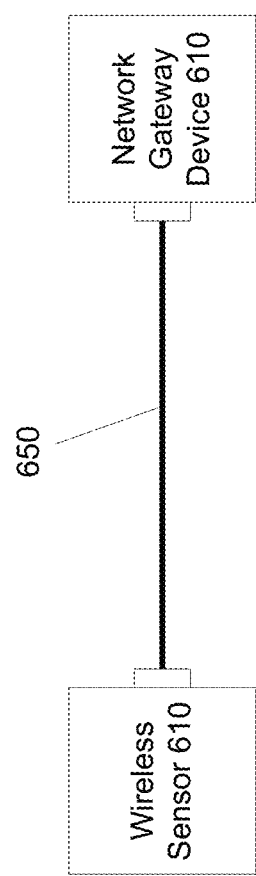
FIG. 6 is a schematic illustration of a wireless sensor coupled to a network gateway device according to an embodiment.

FIG. 6 is a schematic illustration of a wireless sensor 610 and a network gateway device 640 operatively coupled by a cable 650. Wireless sensor 610 and network gateway device 640 can be similar to wireless sensor 110 and network gateway device 140, respectively. FIG. 6 depicts a temporary hardwire connection between wireless sensor 610 and network gateway device 640, for example, during an initial setup process. Network gateway device 640 can assign network ID, channels, data encryption, security keys, and/or any other security feature.

Figure 7:
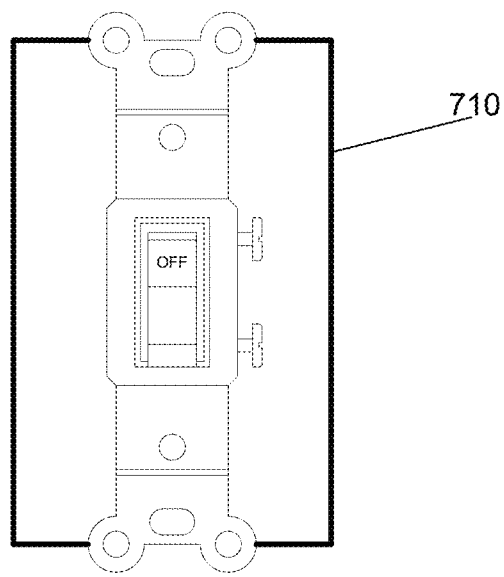
FIG. 7 is an illustration of a wireless sensor according to an embodiment.
Figures 8, 9:
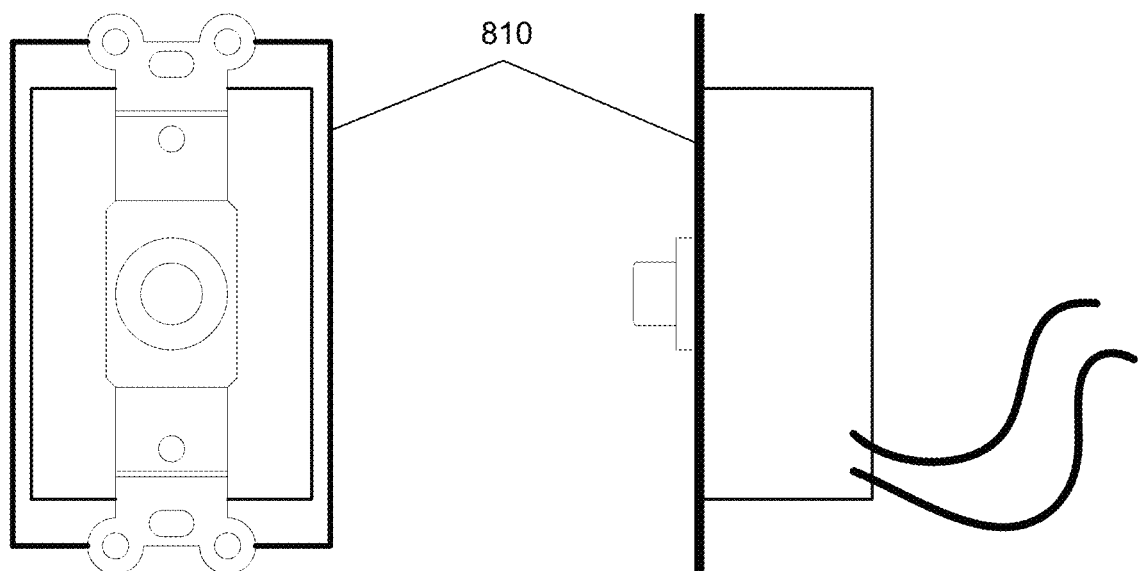
FIG. 8 is an illustration of a front view of a wireless sensor according to an embodiment.
FIG. 9 is an illustration of a side view of the wireless sensor shown in FIG. 8.

FIG. 7 is an illustration of wireless sensor 710, specifically, a rocker type switch. FIG. 8 is an illustration of a front view of a wireless sensor 810, and FIG. 9 is an illustration of a side view of wireless sensor 810, specifically toggle (e.g., momentary) type switch. Wireless sensors 710, 810 can be similar to and can include similar components to wireless sensor 110 described above. Wireless sensors 710, 810 can be configured to be disposed within a standard junction box. In some such embodiments, wireless sensors 710, 810 can include three terminals, and/or wires, to be coupled to a load line, a hot line, and a ground without the need for a neutral wire. In such embodiments, power for operation of the wireless sensor 710, 810 can be obtained by a battery (not shown) contained within the wireless sensor 710,810 that can be mounted at least partially in the junction box. In some embodiments, wireless sensors 710, 810 can harvest energy by trickling a small amount of current from the load line to the ground connection.

Figure 10:
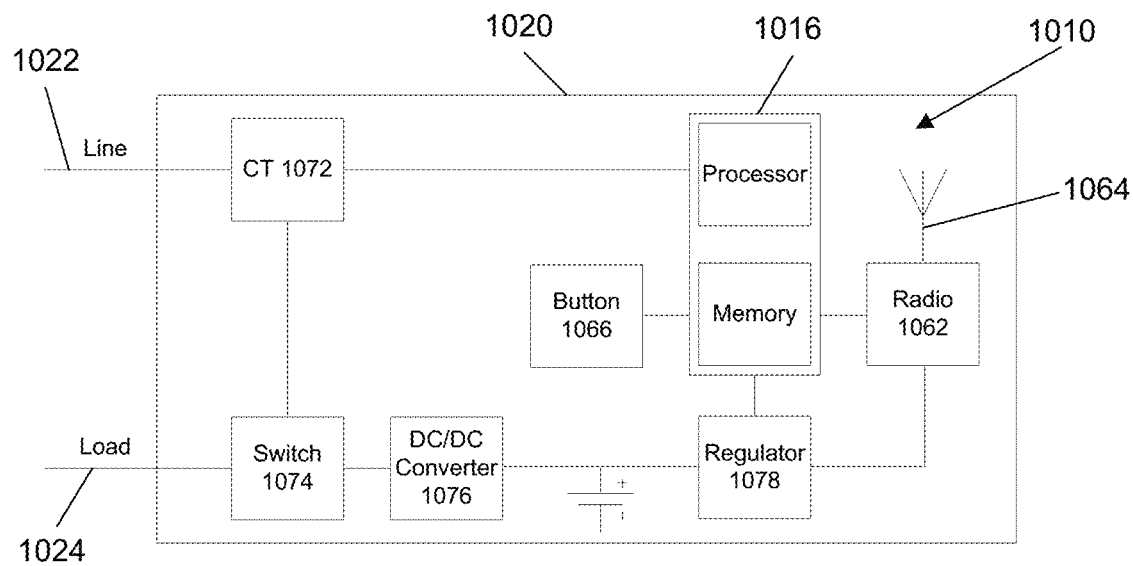
FIG. 10 is a schematic illustration of a wireless sensor and junction box according to an embodiment.
Figure 11:
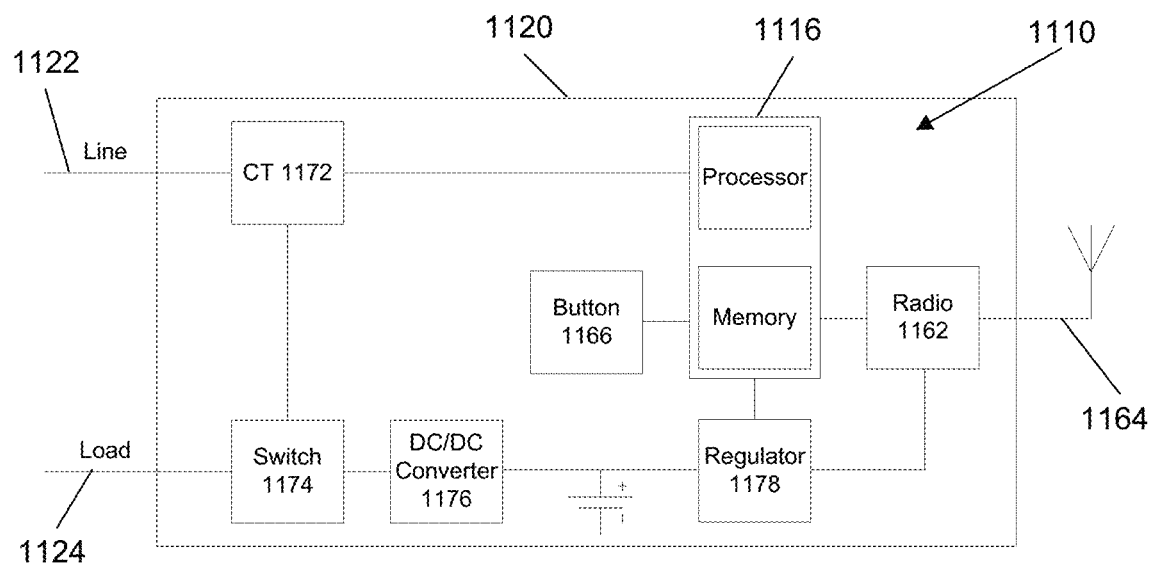
FIG. 11 is a schematic illustration of a wireless sensor and junction box according to an embodiment.
Figure 12:
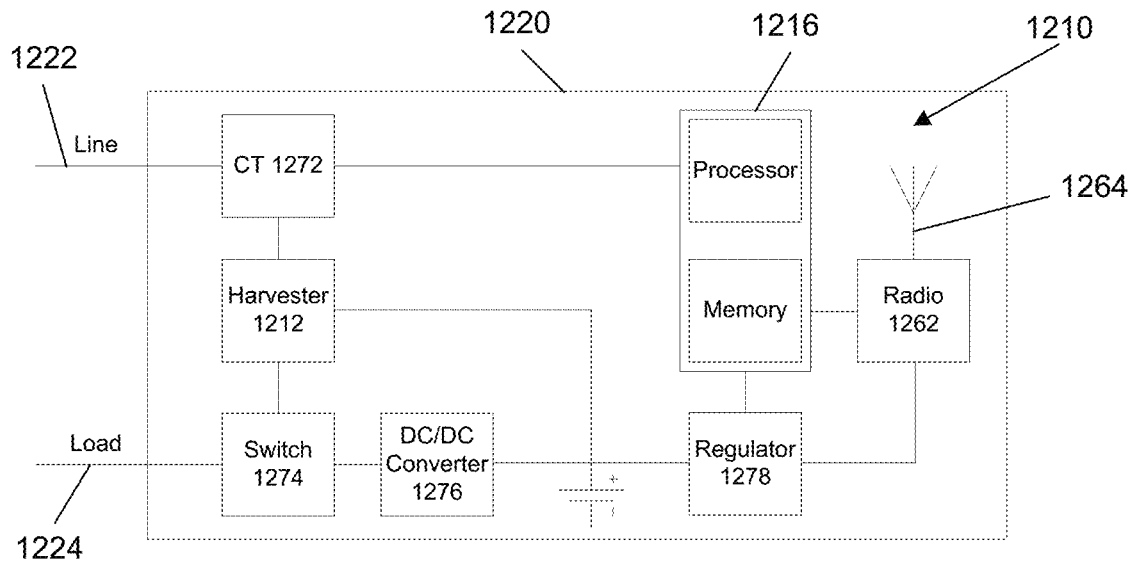
FIG. 12 is a schematic illustration of a wireless sensor and junction box according to an embodiment.
Figure 13:
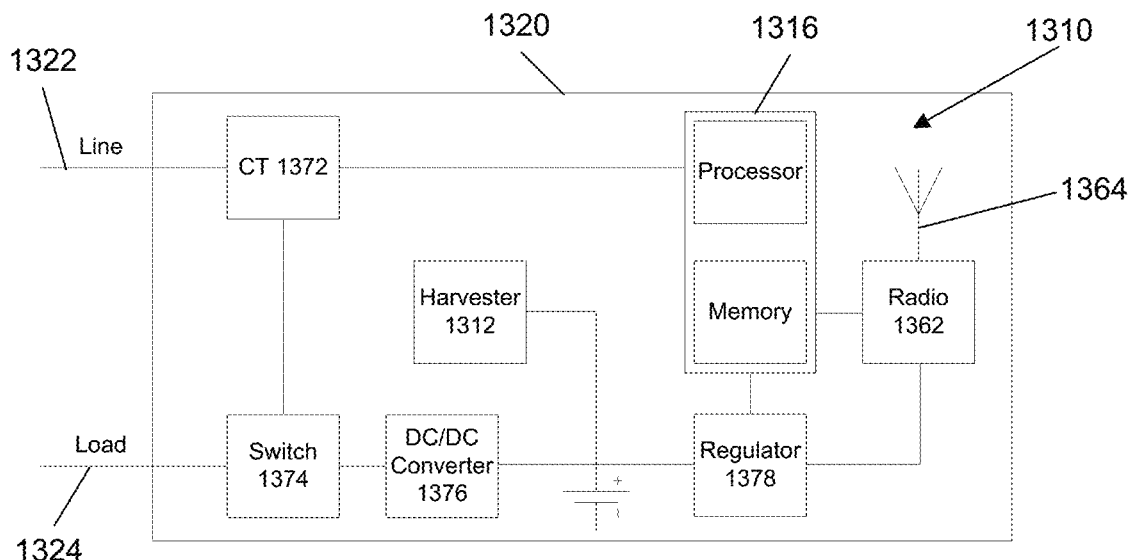
FIG. 13 is a schematic illustration of a wireless sensor and junction box according to an embodiment.
Figure 14:
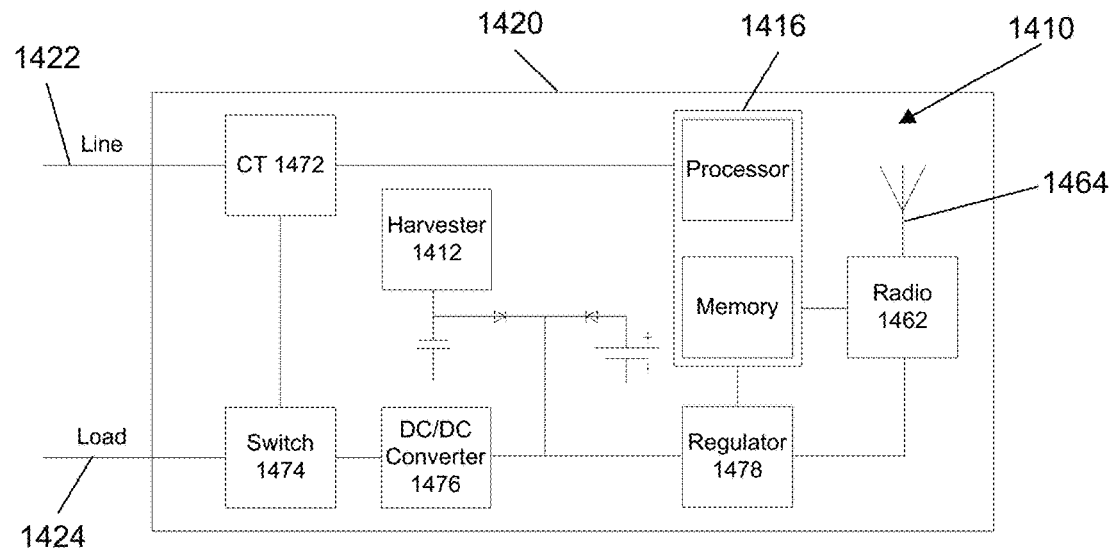
FIG. 14 is a schematic illustration of a wireless sensor and junction box according to an embodiment.
Figure 15:
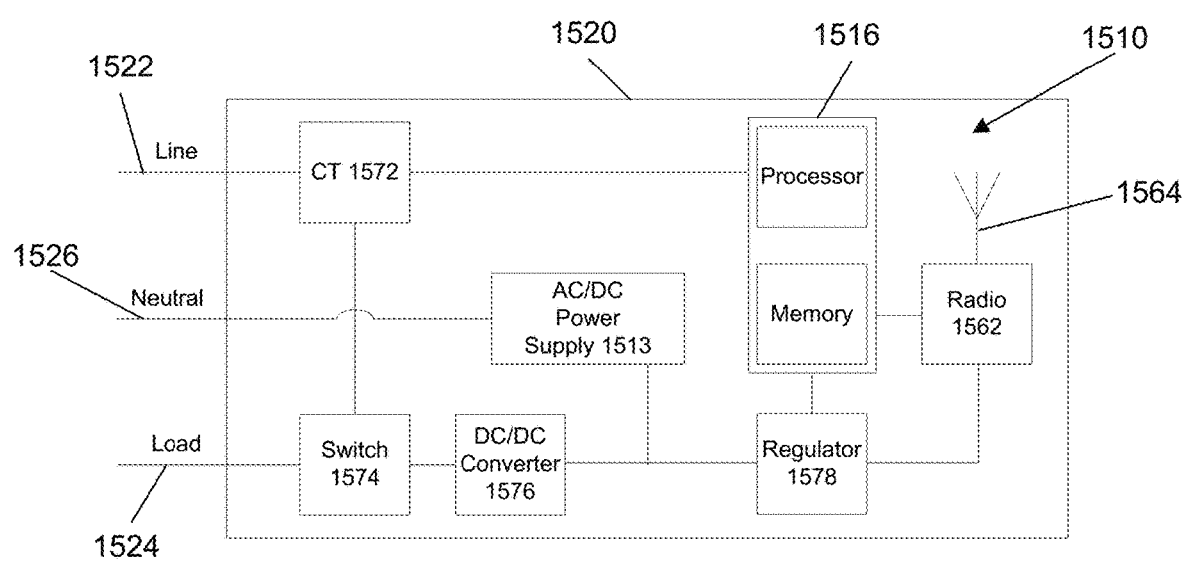
FIG. 15 is a schematic illustration of a wireless sensor and junction box according to an embodiment.

FIGS. 10-15 are schematic illustrations of wireless sensors according to embodiments described herein. Specifically, FIG. 10 illustrates a wireless sensor 1010 including an antenna 1064 disposed within a junction box 1020; FIG. 11 illustrates a wireless sensor 1110 including an antenna 1164 disposed outside a junction box 1120; FIG. 12 illustrates a wireless sensor 1210 including an energy harvester 1212 in a first configuration; FIG. 13 illustrates a wireless sensor 1310 including an energy harvester 1312 in a second configuration; FIG. 14 illustrates a wireless sensor 1410 including an energy harvester 1412 in a third configuration; and FIG. 15 illustrates a wireless sensor 1510 including a power supply 1513 operatively coupled to a junction box 1520. By way of example, a wireless sensor, for example, wireless sensors 1010, 1110, 1210, 1310, 1410, 1510 can include a light or outlet switch configured to sense and/or control whether an electrical switch controlling a light or outlet is opened or closed.

Referring to FIG. 10, wireless sensor 1010 can be at least partially disposed within electrical enclosure 1020, and can include a processor module 1016, a radio 1062, an antenna 1064, a button 1066, a current transformer 1072, a switch 1074 (as an example a relay or TRIAC), a DC/DC converter 1076, and a regulator 1078. Wireless sensor 1010 can operate as a light switch. For example, when button 1066 is pressed, lights associated with wireless sensor 1010 would turn ON or OFF by connecting or disconnecting the load to the AC mains 1022, 1024 (preferably at 120-277 VAC, 50 or 60 Hz). Wireless sensor 1010 can be configured such that, when button 1066 is pressed on, an interrupt is generated within the processor 1016, which can bring wireless sensor 1010 out of a sleep mode. The processor 1016 can toggle a state of switch 1074 to power or de-power a load (e.g. lights) coupled to wireless sensor 1010. Processor 1016 can send, using radio 1062 and antenna 1064, a change of state of wireless sensor 1010, based on, for example, a state of switch 1074, to, for example, a building automation system (BAS) via a wireless sensor system, for example, as described above. In some embodiments, processor 1016 can store the state of the switch and go back to sleep. In such embodiments, processor 1016 can transmit data packets associated with the state on a predetermined schedule and/or at a predetermined interval. Current transformer 1072 can measure an amount of current provided to the load and can send a value if the current provided to the data processor 1016, such that the data processor 1016 can define and send a data packet can to, for example, the BAS, via a wireless sensor system. In some embodiments, antenna 1064 can use at least a portion of electrical enclosure 1020 as part of the antenna 1064. In such embodiments, a radio frequency (RF) current can flow on the exterior of the electrical enclosure 1020 in support of radiation of the wireless (RF) data signal.

In some embodiments, the BAS can monitor the energy usage of the load. In such embodiments, a building having many standard (e.g., not wireless sensors) switches, outlets, and sensors, can be retrofitted with wireless sensors described herein to allow the BAS to wirelessly control the loads on all switches and outlets, in addition to local control by a user. In some embodiments, a BAS may have a schedule of when a room is occupied and unoccupied and use that data to switch ON and OFF wireless sensors within that room. In such embodiments, a user can be in a room labeled unoccupied, and can manually operate the switch to enable the load. In some embodiments, a wireless sensor can include a timer to maintain an ON state a predetermined or programmable time such as one hour. In such embodiments, the wireless sensor can listen for data from the BAS as to whether the room is still labeled unoccupied based on the schedule. When the room is still labeled as unoccupied, the wire sensor can electronically remove power from the load.

Referring to FIG. 11, wireless sensor 1110 can be at least partially disposed within electrical enclosure 1120, and can include a processor module 1116, a radio 1162, an antenna 1164, a button 1166, a current transformer 1172, a switch 1174, a DC/DC converter 1176, and a regulator 1178. Electrical enclosure 1120 can include AC mains 1122, 1124. Wireless sensor 1110 can be similar to and include similar components as wireless sensor 1010. For example, wireless sensor can include a processor module 1116 similar to processor module 1016. Unlike wireless sensor 1010 depicted in FIG. 10, antenna 1164 of wireless sensor 1110 is at least partially disposed outside of electrical enclosure 1120.

Referring to FIG. 12, wireless sensor 1210 can be at least partially disposed within electrical enclosure 1220, and can include the energy harvester 1212, a processor module 1216, a radio 1262, an antenna 1264, a button (not shown in FIG. 12), a current transformer 1272, a switch 1274, a DC/DC converter 1276, and a regulator 1278. Electrical enclosure 1220 can include AC mains 1222, 1224. Wireless sensor 1210 can be similar to and include similar components as wireless sensor 1010. For example, wireless sensor 1210 can include a processor module 1216 similar to processor module 1016. Unlike wireless sensor 1010 depicted in FIG. 10, wireless sensor 1210 includes an energy harvester 1212, which can be similar to the energy harvesters described above. Specifically, when energy harvester 1212 is in the first configuration, for example, energy harvest 1212 can harvest energy from the current flowing through wireless sensor 1210. Energy harvester 1212 can transform a small portion of the current to a usable voltage. The voltage can be rectified to DC and can be used to recharge a battery or another storage device such as a supercapacitor. As shown in FIG. 12, energy harvester 1212 can only harvest energy when the switch 1274 is closed, connecting the line 1222 to the load 1224. In some embodiments, energy harvester 1212 can trickle a small current through a ground wire (not shown) which can enable the wireless sensor 1210 to harvest energy from the line 1222 when the load 1224 is disconnected by the switch 1274. In such embodiments, the trickle current can be less than 6 mA, specifically, less than 3 mA.

Referring to FIG. 13, wireless sensor 1310 can be at least partially disposed within electrical enclosure 1320, and can include the energy harvester 1312, a processor module 1316, a radio 1362, an antenna 1364, a button (not shown in FIG. 13), a current transformer 1372, a switch 1374, a DC/DC converter 1376, and a regulator 1378. Electrical enclosure 1320 can include AC mains 1322, 1324. Wireless sensor 1310 can be similar to and include similar components as wireless sensor 1010. For example, wireless sensor 1310 can include a processor module 1316 similar to processor module 1016. Unlike wireless sensor 1010 depicted in FIG. 10, wireless sensor 1310 includes an energy harvester 1312, which can be similar to the energy harvesters described above. Specifically, when energy harvester 1312 is in the second configuration, for example the energy harvester 1312 can be independent from the AC circuit. More specifically, in some embodiments, energy harvester 1312 can be a solar cell. In such embodiments, the solar cell can be designed to be exposed to the outside of wireless sensor 1310 through a face plate. The face plate can be a standard design or may be custom and integrated in the wireless sensor 1310.

Referring to FIG. 14, wireless sensor 1410 can be at least partially disposed within electrical enclosure 1420, and can include the energy harvester 1412, a processor module 1416, a radio 1462, an antenna 1464, a button (not shown in FIG. 14), a current transformer 1472, a switch 1474, a DC/DC converter 1476, and a regulator 1478. Electrical enclosure 1420 can include AC mains 1422, 1424. Wireless sensor 1410 can be similar to and include similar components as wireless sensor 1010. For example, wireless sensor can include a processor module 1416 similar to processor module 1016. Unlike wireless sensor 1010 depicted in FIG. 10, wireless sensor 1410 includes an energy harvester 1412, which can be similar to the energy harvesters described above. Specifically, when energy harvester 1412 is in the third configuration, for example, energy harvester 1412 can be designed to provide power to wireless sensor 1410 independent of a battery. In such embodiments, energy harvester 1412 and the battery may be diode OR-ed. In some embodiments, when the source of energy used for harvesting is not present (i.e. no light) a battery can be the primary source of energy to power the wireless sensor 1410. In such embodiments, as the source of energy used for harvesting increases, e.g., as the ambient light in a room increases, energy harvester 1412 can augment the battery. In such embodiments, when the source of energy used for harvesting reached a large enough value, energy harvester 1412 can be the primary source of energy to power wireless sensor 1410. In some embodiments, all energy may be provided by energy harvester 1412 and no energy may be provided to the battery to power the wireless sensor 1410. In such embodiments, if energy harvester 1412 has sufficient energy, it can power wireless sensor 1410 and maintain the battery energy. In some embodiments, energy harvester 1412 can charge a supercapacitor or rechargeable battery.

Referring to FIG. 15, wireless sensor 1510 can be at least partially disposed within electrical enclosure 1520, and can include the power supply 1513, a processor module 1516, a radio 1562, an antenna 1564, a button (not shown in FIG. 15), a current transformer 1572, a switch 1574, a DC/DC converter 1576, and a regulator 1578. Electrical enclosure 1520 can include AC mains 1522, 1524 and neutral 1526. Wireless sensor 1510 can be similar to and include similar components as wireless sensor 1010. For example, wireless sensor can include a processor module 1516 similar to processor module 1016. Unlike wireless sensor 1010 depicted in FIG. 10, wireless sensor 1510 includes a power supply 1513. Specifically, because electrical enclosure 1520 includes a neutral line 1026, wireless sensor 1510 can receive power from, for example, building electricity. Power supply 1513 can include an AC/DC converter.

As described herein, with reference to FIGS. 10-15, a wireless sensor may adjust or dim the electrical connection on the load wire via any method such as chopping the AC input from the line wire or by a 0-10V signal to an external dimming device (not shown).

Figure 16:
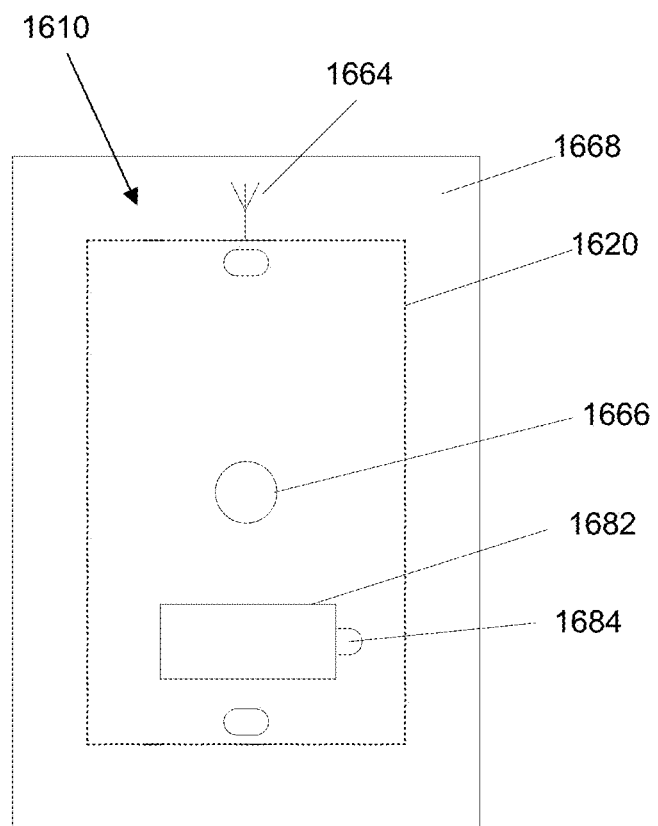
FIG. 16 is an illustration of a wireless sensor, a faceplate, and a junction box according to an embodiment.

FIG. 16 is an illustration of a portion of a wireless sensor 1610 disposed within a electrical enclosure 1620. Specifically, wireless sensor 1610 includes an antenna 1664, a faceplate 1668, a button 1666, a battery compartment door 1682 and a battery compartment door securing device 1684. As shown in FIG. 16, antenna 1664 can be disposed within and/or adjacent to faceplate 1668. Battery compartment door 1682 can provide access for installing and/or replacing a battery (not shown). Battery compartment door securing device 1684 secures batter compartment door 1682 in a closed position and can include, for example, a screw or snapping mechanism. In some embodiments, button 1666 may be implemented using capacitive touch technology using one or more sensing locations. In some embodiments, button 1666 may give the ability to control the switch and also dim the electrical connection between a line wire and a load wire.

As described herein, with reference to FIGS. 1-16, a wireless sensor can be, at least partially disposed within an electrical enclosure, specifically a junction box, and one or more antennas can be disposed internal, external, partially internal, or integral to the junction box. In some embodiments, a characteristic of the junction box can determine a positioning of an antenna. In some embodiments, the junction box can include metal or can include plastic. In some embodiments, a faceplate associated with the junction box and/or wireless sensor can include plastic and allow the antenna mounting within the junction box and RF energy can exit the box through the plastic face plate when the junction box is metal. Alternatively, when the junction box is plastic, RF energy can exit through both the face plate and junction box. In some embodiments, the antenna can exit the junction box to maximize performance by minimizing the influence of the metal junction box. In some embodiments, the antenna may be cabled to the junction box or may be panel mounted on the side or top of the junction box, a stud, or a wall.

In some embodiments, the antenna may use the junction box as a ground plane or as part of the antenna's radiating structure. In some embodiments, the antenna can also be formed by using a metal junction box and face plate and using a slot within the face plate. By way of example, a junction box can be metal. The metal of the junction box can prevent a standard antenna from working properly because the junction box can shield radiation and/or detune the antenna.

In some embodiments, the antenna may use the junction box as a ground plane for the antenna without a physical connection of the RF ground of the radio to the earth ground of the junction box. Isolation between the grounds is performed using a dielectric. The RF signal establishes a virtual ground connection using the capacitance formed between the RF ground and earth ground through the dielectric.

In some embodiments, an antenna can use metal of a junction box as part of the antenna to improve performance. In such embodiments, the antenna can use a plastic junction box cover. In such embodiments, the antenna structure includes a metal plane, orthogonal metal wings, and a point fed plane. The point fed plane can be constructed on a dielectric such as FR4 and can also have a superstrate that can cover the plane, and can be made of a second dielectric, for example, plastic. In such embodiments, the antenna is a hybrid between a patch antenna, an inverted-F antenna, and a dipole antenna. Additionally, the metal plane includes orthogonal wings to ensure resonance in a multi-gang or plastic junction box. In such an embodiment, the junction box acts as half of a dipole antenna while the point fed plane acts as the other half. The metal plane under the point fed plane can force the current associated with an RF wave to flow on the outside of the junction box to form a dipole type antenna (the point fed plane can be the positive side of the dipole and the metal plane combined with the junction box metal and orthogonal wings can be the negative side of the dipole). In another example, the junction box is a plastic junction box, and orthogonal wings allow the current associate with an RF wave to flow rearwards as is the case in a metal junction box. This can allow the resonance of the antenna to be maintained (return loss less then −7 dB). Said another way, the resonant frequency of an antenna occurs when the impedance of the antenna is the complex conjugate for the source or load impedance. In an example, an antenna can be designed to be 50 ohms to match the 50 impedance of the connected radio transceiver. In such an example, return loss can be a measure of how close to 50 ohms (or other impedance for non-50 ohm systems) the antenna is. In the example, a return loss of less than −10 dB can be a good match, e.g. the antenna is resonant at that frequency or over that frequency range. Additionally, the orthogonal wings can allow the antenna to stay in resonance when mounted in a multi-gang metal junction box. In some embodiments, the metal plane and metal orthogonal wings can be formed from a single piece of bent metal. The orthogonal wings can be spaced, for example, at least 1 mm from the junction box walls. In some embodiments, the antenna can be used as part of a button in a wireless sensor. In some embodiments, the point fed point can be used as part of the antenna and as a capacitive touch button to eliminate the mechanical motion of the antenna.

Figure 17:
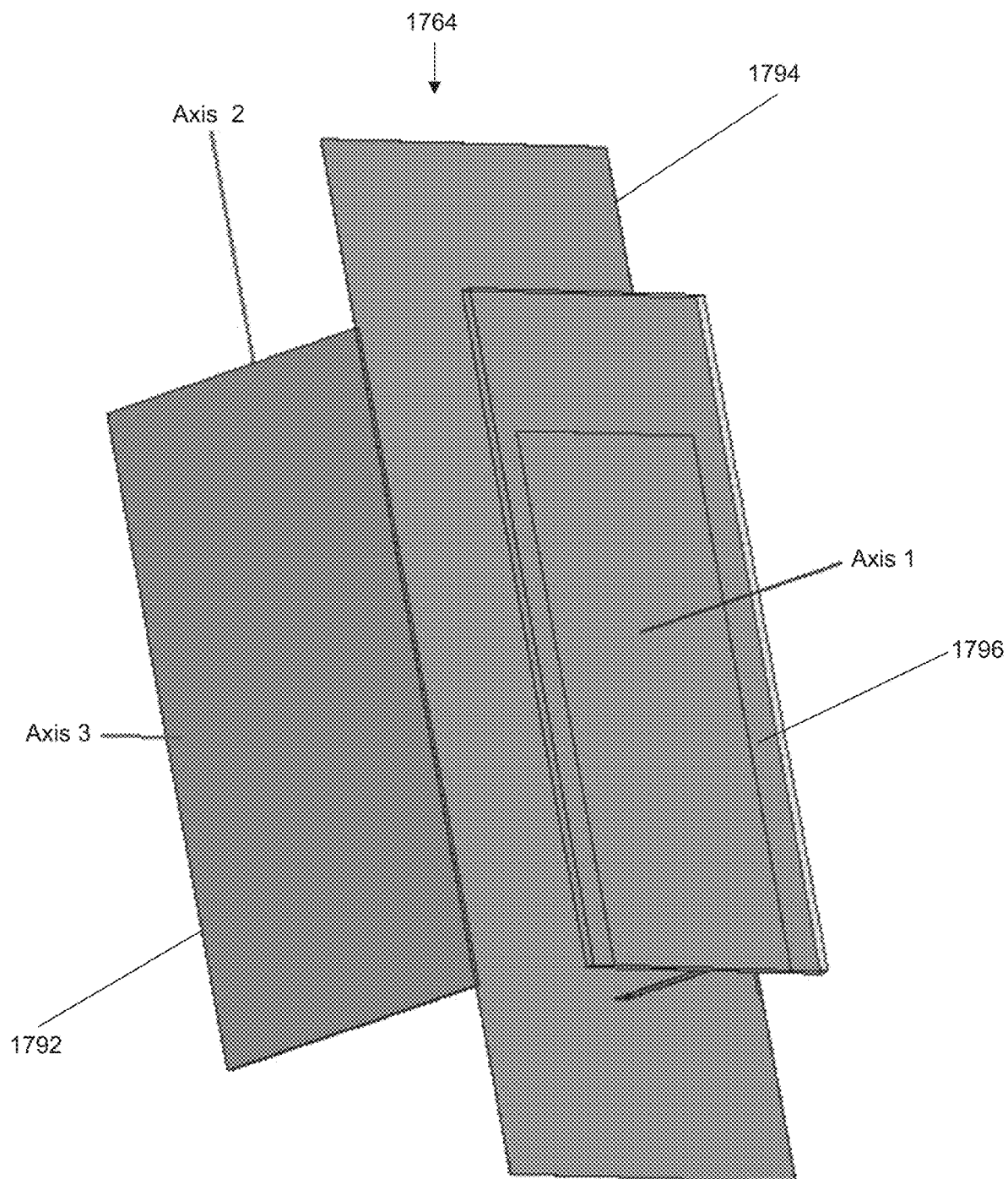
FIG. 17 is an illustration of a front perspective view of an antenna of a wireless sensor according to an embodiment.
Figure 18:
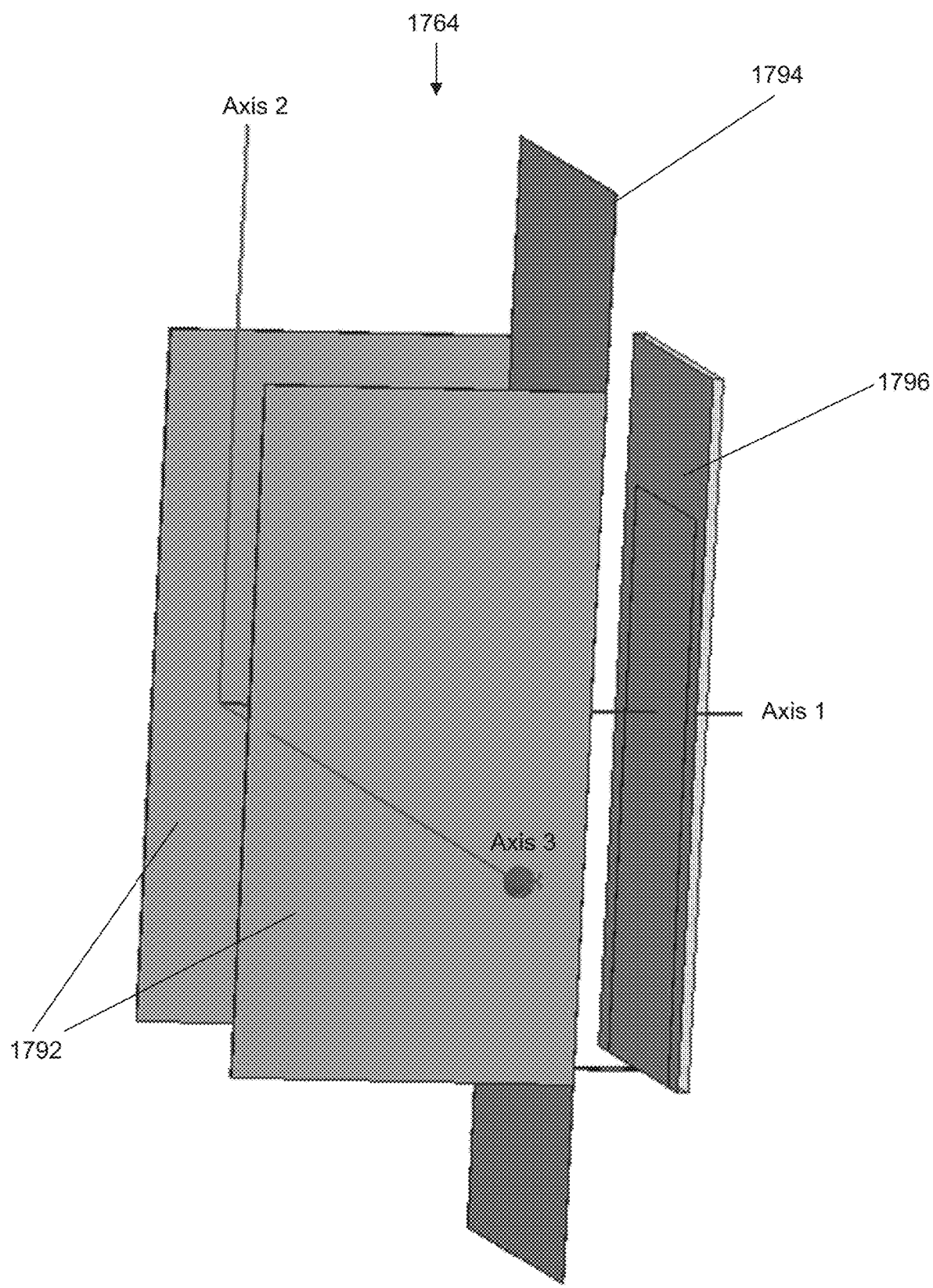
FIG. 18 is an illustration of a rear perspective view of the antenna shown in FIG. 17.
Figure 19:
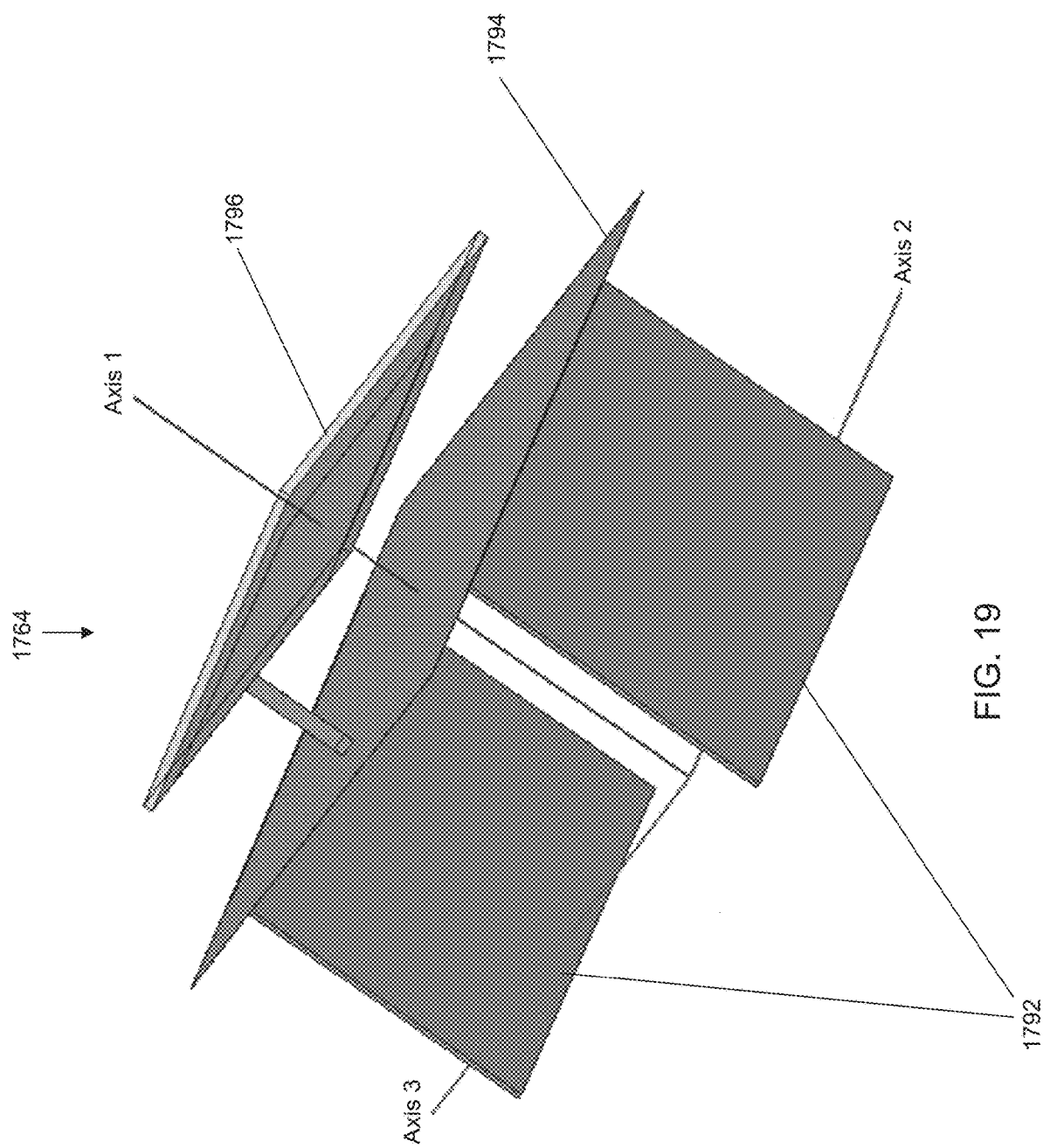
FIG. 19 is an illustration of a second rear perspective view of the antenna shown in FIG. 17.
Figure 20:
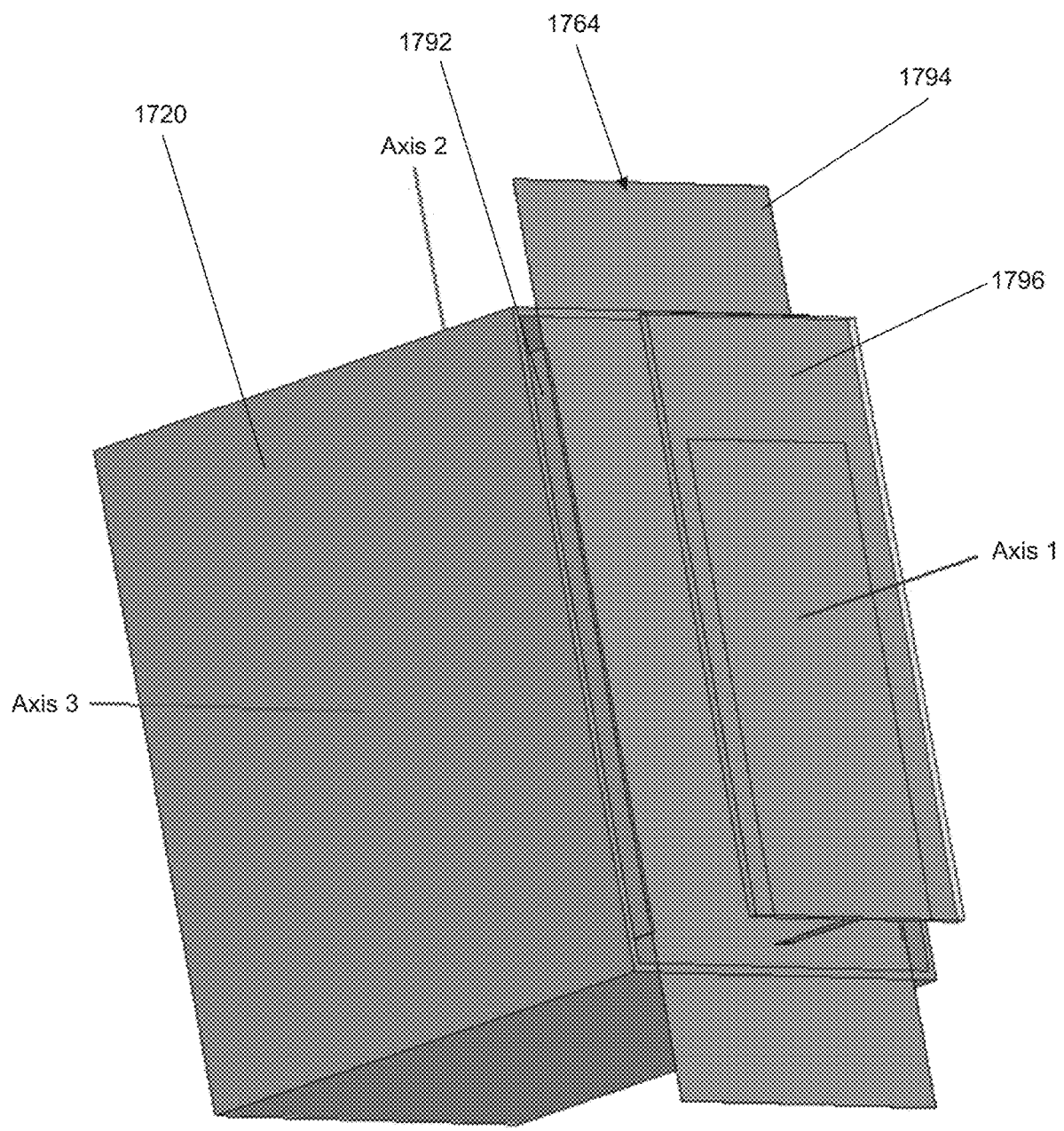
FIG. 20 is an illustration of a front perspective view of the antenna shown in FIG. 17 at least partially disposed in a junction box according to an embodiment.
Figure 21:
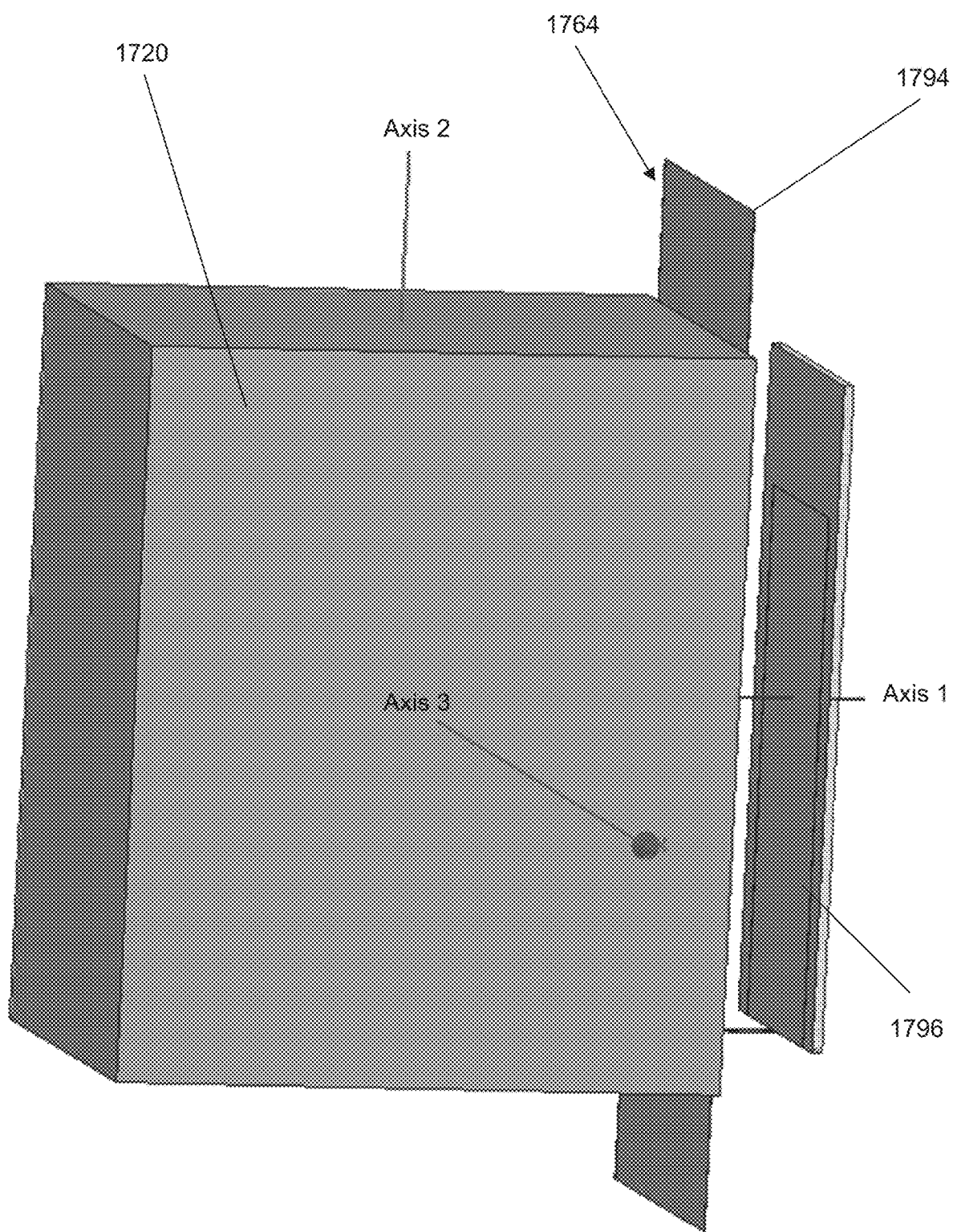
FIG. 21 is an illustration of a rear perspective view of the antenna shown in FIG. 17 at least partially disposed in a junction box according to an embodiment.
Figure 22:
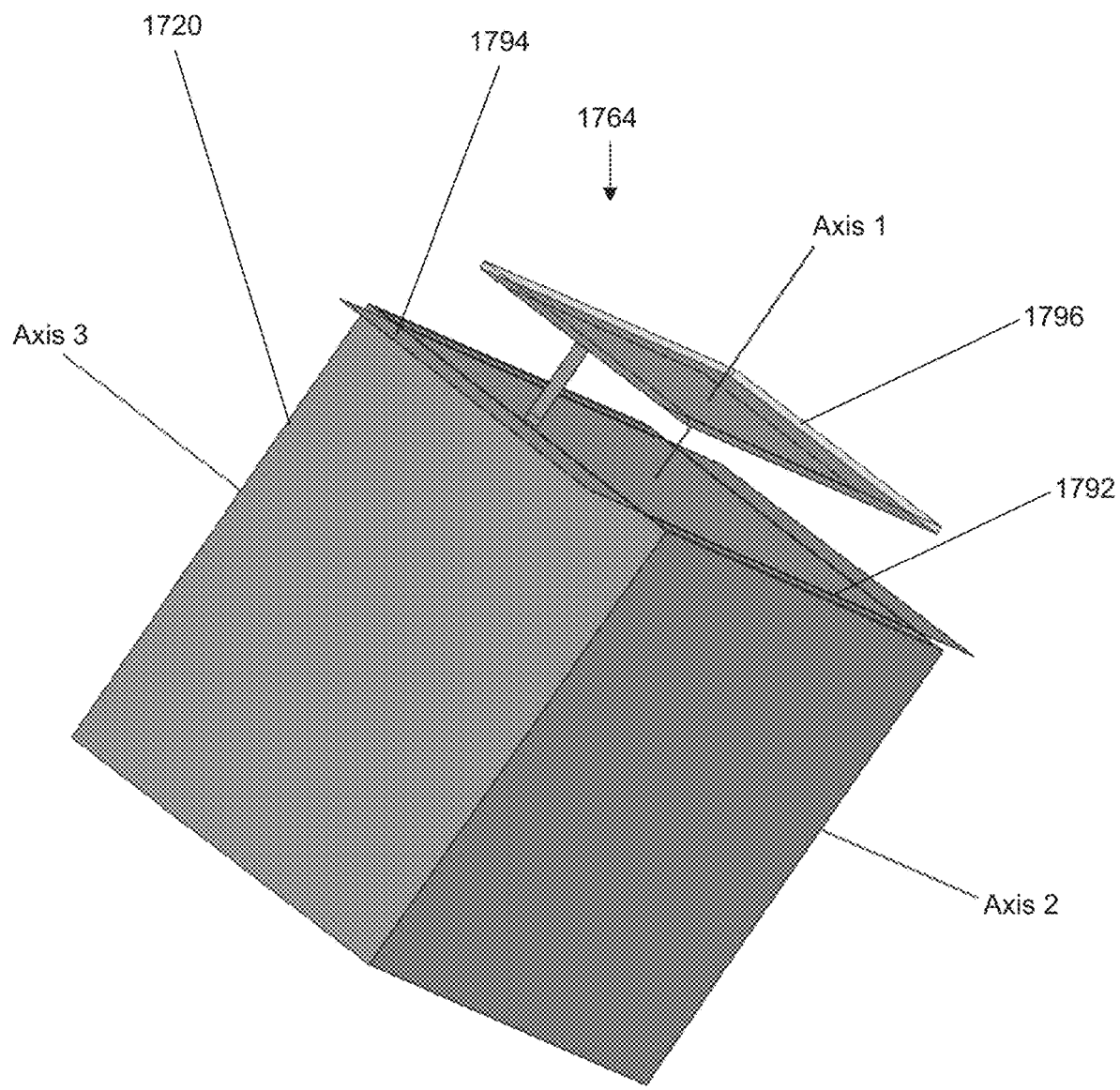
FIG. 22 is an illustration of a second rear perspective view of the antenna shown in FIG. 17 at least partially disposed in a junction box according to an embodiment.

FIGS. 17-22 depict illustrations of various views of an antenna of a wireless sensor with and without an associated junction box. Specifically, FIG. 17 is an illustration of a front perspective view of an antenna of a wireless sensor according to an embodiment; FIG. 18 is an illustration of a rear perspective view of the antenna shown in FIG. 17; FIG. 19 is an illustration of a second rear perspective view of the antenna shown in FIG. 17; FIG. 20 is an illustration of a front perspective view of the antenna shown in FIG. 17 at least partially disposed in a junction box according to an embodiment; FIG. 21 is an illustration of a rear perspective view of the antenna shown in FIG. 17 at least partially disposed in a junction box according to an embodiment; and FIG. 22 is an illustration of a second rear perspective view of the antenna shown in FIG. 17 at least partially disposed in a junction box according to an embodiment. As shown in FIGS. 17-22, an antenna 1764 includes a metal plane 1794, orthogonal wings 1792, and a point fed plane 1796. Also as shown in FIGS. 20-22, antenna 1764 can be at least partially disposed in a junction box 1720.

While various embodiments described herein describe a particular number of wireless sensors, wireless repeaters, and/or network gateway devices, wireless sensor systems described herein can include any number of wireless sensors, wireless repeaters, and/or network gateway devices, for example, to provide redundancy. By way of example, a multi-story building can include a network gateway device on a top floor and on a bottom floor, and each wireless sensor can include at least one path, via wireless repeaters to the network gateway device on the top floor and/or on the bottom floor.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the devices can include or relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of the embodiments where appropriate.

What is claimed is:

1. An apparatus, comprising:
a junction box defining an interior cavity; and
a wireless device at least partially disposed within the interior cavity, the wireless device including a processor, a button operatively coupled to the processor, a power storage component operatively coupled to the processor, a switch operatively coupled to the processor, a radio operatively coupled to the processor, and an antenna operatively coupled to the radio,
the wireless device configured to be coupled to a first AC line via a first connection and to a second AC line via a second connection, the switch coupled to the first connection and the second connection and configured to transition between a first configuration in which power can be provided from the first AC line to the second AC line via the switch and a second configuration in which power is not provided to the second AC line, the processor configured to transition the switch between the first configuration and the second configuration in response to a user's physical interaction with the button, the radio and the antenna configured to communicate a value of a characteristic of the wireless device to a network gateway device, the power storage component configured to provide operational power to the processor.

2. The apparatus of claim 1, wherein, when the switch is in the second configuration, a charging power is configured to be provided from the first AC line to the power storage component via the switch to increase a stored power level of the power storage component.

3. The apparatus of claim 1, wherein the value of the characteristic of the wireless device is associated with a status of the switch.

4. The apparatus of claim 1, wherein the wireless device is disposed entirely within the junction box.

5. The apparatus of claim 1, wherein the antenna is disposed outside of the junction box and is coupled to the wireless device through an opening in the junction box.

6. The apparatus of claim 1, wherein the wireless device includes an energy harvester coupled to the first connection and to the second connection, the energy harvester configured to transform a portion of a current flowing from the first connection to the second connection via the switch to a voltage usable by the wireless device when the switch is in the first configuration.

7. The apparatus of claim 1, wherein:
the wireless device includes an energy harvester coupled to the first connection and to the second connection, the energy harvester configured to transform a portion of a current flowing from the first connection to the second connection via the switch to a voltage usable by the wireless device when the switch is in the first configuration,
the energy harvester can provide the voltage to the power storage component to increase a stored power level of the power storage component.

8. The apparatus of claim 1, wherein:
the wireless device includes an energy harvester coupled to the first connection and to the second connection, the energy harvester configured to transform a portion of a current flowing from the first connection to the second connection via the switch to a voltage usable by the wireless device when the switch is in the first configuration,
the energy harvester can provide operational power to the processor independent of the power storage component.

9. The apparatus of claim 1, wherein:
the wireless device includes an energy harvester coupled to the first connection and to the second connection, the energy harvester configured to transform a portion of a current flowing from the first connection to the second connection via the switch to a voltage usable by the wireless device when the switch is in the first configuration,
the current is a first current and the voltage is a first voltage, the energy harvester including a ground wire, the energy harvester configured to trickle a second current through the ground line and to transform a third current flowing from the first AC line to a second voltage usable by the wireless device when the switch is in the second configuration.

10. The apparatus of claim 1, wherein the operational power is a first operational power, the wireless device including an energy harvester configured to provide a second operational power to the processor independent of the power storage component providing the first operational power to the processor.

11. The apparatus of claim 1, wherein:
the operational power is a first operational power, the wireless device including an energy harvester configured to provide a second operational power to the processor independent of the power storage component providing the first operational power to the processor,
the energy harvester includes a solar cell.

12. The apparatus of claim 1, wherein:
the operational power is a first operational power, the wireless device including an energy harvester configured to provide a second operational power to the processor independent of the power storage component providing the first operational power to the processor,
an amount of the first operational power provided by the power storage component to the processor can be based, at least in part, on an amount of the second operational power provided by the energy harvester.

13. The apparatus of claim 1, wherein the wireless device includes a current transformer, the current transformer coupled to the first connection such that operational power can be provided to the second AC line from the first AC line via the transformer and the switch when the switch is in the first configuration.

14. The apparatus of claim 1, wherein:
the wireless device includes a current transformer, the current transformer coupled to the first connection such that operational power can be provided to the second AC line from the first AC line via the transformer and the switch when the switch is in the first configuration,
the current transformer is configured to measure a current level of the power provided from the first AC line to the second AC line via the current transformer when the switch is in the first configuration and to send a value of the current level to the processor, the processor configured to send the value of the current level to the network gateway device via the radio and the antenna.

15. The apparatus of claim 1, wherein the antenna is a first antenna portion and the junction box is a second antenna portion, the second antenna portion is an antenna ground plane during operation of the antenna.

16. The apparatus of claim 1, wherein:
the antenna is a first antenna portion and the junction box is a second antenna portion, the second antenna portion is an antenna ground plane during operation of the antenna,
a radio frequency ground of the radio and the second antenna portion are substantially electrically isolated by a dielectric such that a radio frequency signal radiated by the first antenna portion establishes a virtual ground connection using a capacitance formed between the radio frequency ground and an earth ground of the junction box through the dielectric.

17. The apparatus of claim 1, wherein the antenna is a first antenna portion and the junction box includes a second antenna portion.

18. The apparatus of claim 1, wherein:
the antenna includes a metal plane portion, a point fed plane portion, a first metal wing portion, and a second metal wing portion,
each of the first metal wing portion and the second metal wing portion is coupled to and extends orthogonally from the metal plane portion and parallel to each other.

19. The apparatus of claim 1, wherein:
the antenna includes a metal plane portion, a point fed plane portion, a first metal wing portion, and a second metal wing portion,
each of the first metal wing portion and the second metal wing portion is coupled to and extends orthogonally from the metal plane portion and parallel to each other,
the first metal wing portion and the second metal wing portion are disposed within the junction box and the metal plane portion, and
the point fed plane portion is disposed outside of the junction box.

20. The apparatus of claim 1, wherein:
the antenna includes a metal plane portion, a point fed plane portion, a first metal wing portion, and a second metal wing portion,
each of the first metal wing portion and the second metal wing portion is coupled to and extends orthogonally from the metal plane portion and parallel to each other,
the first metal wing portion and the second metal wing portion are disposed within the junction box and the metal plane portion,
the point fed plane portion is disposed outside of the junction box,
the junction box is a plastic junction box and the antenna is configured to operate with a return loss of less than −7 dB.

21. The apparatus of claim 1, wherein:
the antenna includes a metal plane portion, a point fed plane portion, a first metal wing portion, and a second metal wing portion,
each of the first metal wing portion and the second metal wing portion is coupled to and extends orthogonally from the metal plane portion and parallel to each other,
the first metal wing portion and the second metal wing portion are disposed within the junction box and the metal plane portion,
the point fed plane portion is disposed outside of the junction box,
the junction box is a multi-gang junction box and the antenna is configured to operate with a return loss of less than −7 dB.

22. The apparatus of claim 1, wherein the antenna is a first antenna portion and the button includes a second antenna portion.

23. An apparatus, comprising:
a junction box defining an interior cavity; and
a wireless device at least partially disposed within the interior cavity, the wireless device including a processor, a button operatively coupled to the processor, an AC/DC converter operatively coupled to the processor, a switch operatively coupled to the processor, a radio operatively coupled to the processor, and an antenna operatively coupled to the radio,
the wireless device configured to be coupled to a first AC line via a first connection, to a second AC line via a second connection, and to a neutral line via a third connection,
the switch coupled to the first connection and the second connection and configured to transition between a first configuration in which operational power can be provided from the first AC line to the second AC line via the switch and a second configuration in which operational power is not provided to the second AC line, the processor configured to transition the switch between the first configuration and the second configuration in response to a user's physical interaction with the button, the radio and the antenna configured to communicate a value of a characteristic of the wireless device to a network gateway device, the processor configured to receive operational power from the first AC line via the switch when the switch is in the second configuration, the processor coupled to the neutral line via the AC/DC converter.

24. The apparatus of claim 23, wherein the value of the characteristic of the wireless device is associated with a status of the switch.

25. The apparatus of claim 23, wherein the wireless device is disposed entirely within the junction box.

26. The apparatus of claim 23, wherein the antenna is disposed outside of the junction box and is coupled to the wireless device through an opening in the junction box.

27. The apparatus of claim 23, wherein the wireless device includes a current transformer, the current transformer coupled to the first connection such that operational power can be provided to the second AC line from the first AC line via the transformer and the switch when the switch is in the first configuration.

28. The apparatus of claim 23, wherein:
the wireless device includes a current transformer, the current transformer coupled to the first connection such that operational power can be provided to the second AC line from the first AC line via the transformer and the switch when the switch is in the first configuration,
the current transformer is configured to measure a current level of the power provided from the first AC line to the second AC line via the current transformer when the switch is in the first configuration and to send a value of the current level to the processor, the processor configured to send the value of the current level to the network gateway device via the radio and the antenna.

29. The apparatus of claim 23, wherein the antenna is a first antenna portion and the junction box is a second antenna portion, the second antenna portion configured to function as an antenna ground plane.

30. The apparatus of claim 23, wherein:
the antenna is a first antenna portion and the junction box is a second antenna portion, the second antenna portion configured to function as an antenna ground plane, a radio frequency ground of the radio and the second antenna portion are substantially electrically isolated by a dielectric such that a radio frequency signal radiated by the first antenna portion establishes a virtual ground connection using a capacitance formed between the radio frequency ground and an earth ground of the junction box through the dielectric.

31. The apparatus of claim 23, wherein the antenna is a first antenna portion and the junction box includes a second antenna portion.

32. The apparatus of claim 23, wherein:

the antenna includes a metal plane portion, a point fed plane portion, a first metal wing portion, and a second metal wing portion, each of the first metal wing portion and the second metal wing portion coupled to and extending orthogonally from the metal plane portion and parallel to each other.

33. The apparatus of claim 23, wherein:

the antenna includes a metal plane portion, a point fed plane portion, a first metal wing portion, and a second metal wing portion, each of the first metal wing portion and the second metal wing portion coupled to and extending orthogonally from the metal plane portion and parallel to each other, the first metal wing portion and the second metal wing portion are disposed within the junction box, and the metal plane portion and the point fed plane portion are disposed outside of the junction box.

34. The apparatus of claim 23, wherein:

the antenna includes a metal plane portion, a point fed plane portion, a first metal wing portion, and a second metal wing portion, each of the first metal wing portion and the second metal wing portion coupled to and extending orthogonally from the metal plane portion and parallel to each other, the first metal wing portion and the second metal wing portion are disposed within the junction box, the metal plane portion and the point fed plane portion are disposed outside of the junction box, the junction box is a plastic junction box and the antenna is configured to operate with a return loss of less than −7 dB.

35. The apparatus of claim 23, wherein:

the antenna includes a metal plane portion, a point fed plane portion, a first metal wing portion, and a second metal wing portion, each of the first metal wing portion and the second metal wing portion coupled to and extending orthogonally from the metal plane portion and parallel to each other, the first metal wing portion and the second metal wing portion are disposed within the junction box, the metal plane portion and the point fed plane portion are disposed outside of the junction box, the junction box is a multi-gang junction box and the antenna is configured to operate with a return loss of less than −7 dB.

36. The apparatus of claim 23, wherein the antenna is a first antenna portion and the button includes a second antenna portion.

* * * * *